(12) United States Patent
Fujiwara et al.

(10) Patent No.: US 8,861,073 B2
(45) Date of Patent: Oct. 14, 2014

(54) OPTICAL FIBER DELIVERY SYSTEM FOR DELIVERING OPTICAL SHORT PULSES AND OPTICAL FIBER DELIVERY METHOD

(75) Inventors: Masato Fujiwara, Hachioji (JP); Kenji Taira, Tokyo (JP)

(73) Assignee: Olympus Corporation, Tokyo (JP)

( * ) Notice: Subject to any disclaimer, the term of this patent is extended or adjusted under 35 U.S.C. 154(b) by 168 days.

(21) Appl. No.: 13/307,463

(22) Filed: Nov. 30, 2011

(65) Prior Publication Data

US 2012/0134011 A1    May 31, 2012

(30) Foreign Application Priority Data

Nov. 30, 2010   (JP) ................. 2010-267519
Dec. 28, 2010   (JP) ................. 2010-293572

(51) Int. Cl.
*G02F 1/365* (2006.01)
*H01S 3/00* (2006.01)
*H04B 10/508* (2013.01)

(52) U.S. Cl.
CPC ............ *H04B 10/508* (2013.01); *H01S 3/0057* (2013.01); *H01S 3/0092* (2013.01)
USPC ................. 359/326; 359/337.5; 359/615

(58) Field of Classification Search
USPC ............. 359/326–332, 337.5, 341.1, 615
See application file for complete search history.

(56) References Cited

U.S. PATENT DOCUMENTS

| 6,249,630 | B1  |   | 6/2001 | Stock et al.                |
|-----------|-----|---|--------|-----------------------------|
| 7,072,101 | B2  | * | 7/2006 | Kapteyn et al. ...... 359/337.5 |
| 7,551,809 | B2  | * | 6/2009 | Taira et al. ............ 385/1   |

FOREIGN PATENT DOCUMENTS

| JP | 2008-268589    | 11/2008 |
| JP | 2009-180812 A  | 8/2009  |
| WO | WO 2009/119585 A1 | 10/2009 |

OTHER PUBLICATIONS

Notice of Reasons for Refusal dated Jul. 22, 2014 from Japanese Application No. 2010-293572, together with an English translation.

* cited by examiner

*Primary Examiner* — Daniel Petkovsek
(74) *Attorney, Agent, or Firm* — Scully, Scott, Murphy & Preser, P.C.

(57) ABSTRACT

The optical fiber delivery system for delivering optical short pulses includes: a chirped pulse source (10) for emitting an up-chirped optical short pulse having high peak power; optical waveguide unit (20) for delivering the optical short pulse emitted from the chirped pulse source (10); negative group-velocity dispersion generation unit (30) for providing negative group-velocity dispersion to the optical short pulse exited from the optical waveguide unit (20); and an optical fiber (40) for delivering the optical short pulse exited from the negative group-velocity dispersion generation unit (30), along a desired distance, in which the optical short pulse emitted from the chirped pulse source (10) is adapted to be exited, from the optical fiber (40), as a down-chirped optical short pulse that is substantially free of waveform distortion resulting from higher-order dispersion.

8 Claims, 21 Drawing Sheets

OPTICAL FIBER DELIVERY SYSTEM FOR DELIVERING OPTICAL SHORT PULSES AND OPTICAL FIBER DELIVERY METHOD

CROSS REFERENCE TO RELATED APPLICATIONS

The present application claims priority from Japanese Patent Applications No. 2010-267519 filed on Nov. 30, 2010, and No. 2010-293572 filed on Dec. 28, 2010, the contents of which are incorporated herein by reference.

TECHNICAL FIELD

The present invention relates to an optical fiber delivery system for delivering optical short pulses and an optical fiber delivery method.

RELATED ART

In recent years, sub-picosecond optical short pulses, having high peak power and a plurality of wavelength components, have been used in various fields, such as biology, medicine, medical care, processing, measurement, and communication. In particular, in the fields of biology and medicine, an optical pulse source that generates optical short pulses, such as a titanium:sapphire laser and a fiber laser, has been frequently used in a microscope using nonlinear optical effects, such as a multiphoton fluorescence microscope, a harmonic generation microscope, and a coherent anti-Stokes Raman scattering (CARS) microscope; a gene transfer apparatus using optical stress waves; a diffuse optical tomography apparatus; and the like.

Optical short pulses having high peak power emitted from any of such optical pulse sources are delivered to an optical apparatus, such as any of the microscopes described above, by using a reflective mirror or an optical fiber. From the viewpoints of operability and stability, it is strongly desired to use an optical fiber to deliver the optical short pulses.

However, the optical short pulses having high peak power are known to be temporally broadened during the propagation in the optical fiber due to the group-velocity dispersion (GVD) effect, the nonlinear optical effect such as a self-phase modulation (SPM) effect, and the interaction therebetween in the optical fiber. Such temporal broadening of an optical pulse leads to problems in many applications.

For example, in the field of processing, thermal deformation of metal simultaneously occurs during metal cutting or the like, and hence the pulse broadening leads to a failure in forming a sharp edge in microfabrication. Also, in the field of communication, the temporal broadening of an optical pulse results in a reduction in communication rate or in an increase in symbol error rates. Further, in a nonlinear optical microscope such as a multiphoton fluorescence microscope, which requires ultrashort optical pulses having high peak power, if the pulses are temporally broadened in an optical fiber, the peak power of each of the optical pulses decreases accordingly, and hence the microscope image is reduced in brightness.

In a multiphoton fluorescence microscope, the multiphoton fluorescence intensity $I_n$ and the peak power $P_0$ of an optical pulse are expressed by the following expressions (1) and (2), respectively.

[Expression 1]

$$I_n = C_0 P_0^n T_0 f_{rep} \quad (1)$$

$$P_0 = C_1 \frac{P_{av}}{f_{rep} T_0} \quad (2)$$

In the above expressions (1) and (2), reference character n represents a natural number, which is 2, 3, and k for two-photon fluorescence, three-photon fluorescence, and k-photon fluorescence, respectively. Reference characters $C_0$ and $C_1$ each represent a constant. Reference character $T_0$ represents the temporal width of the optical pulse. Reference character $f_{rep}$ represents the repetition rate of each optical pulse. Reference character $P_{av}$ represents the average power of each optical pulse. By using the expression (2) to rewrite the expression (1), the multiphoton fluorescence intensity $I_n$ is expressed by the following expression (3).

[Expression 2]

$$I_n = C \frac{P_{av}^n}{(f_{rep} T_0)^{n-1}} \quad (3)$$

The expression (3) shows that the multiphoton fluorescence intensity $I_n$ decreases as the temporal width $T_0$ of the optical pulse broadens, while the multiphoton fluorescence intensity $I_n$ increases as the temporal width $T_0$ of the optical pulse narrows.

There has been known a fiber delivery system for delivering optical short pulses which avoids the temporal broadening of the optical pulses, in which, for example, a negative group-velocity dispersion generation unit 230, such as a pair of diffraction gratings and a pair of prisms, is disposed between an optical waveguide unit 220 and an optical fiber 240 as illustrated in FIG. 20, so that the negative group-velocity dispersion generation unit 230 compensates the interaction between the GVD effect and the SPM effect that affects the optical pulses in the optical waveguide unit 220 and the optical fiber 240, to thereby deliver optical short pulses (see, for example, JP 2008-268589 A).

Alternatively, there has also been known an optical pulse delivery system, in which, in order to avoid the nonlinear effect such as the SPM effect in an optical fiber, a large GVD effect is provided in advance to optical short pulses so as to deliver optical short pulses having a lower peak power through the optical fiber (see, for example, U.S. Pat. No. 6,249,630).

DISCLOSURE OF THE INVENTION

Problems to be Solved by the Invention

According to the above-mentioned optical fiber delivery system for delivering optical short pulses disclosed in JP 2008-268589 A, the optical apparatus such as a microscope disposed downstream of the optical fiber delivery system has normal dispersion. Thus, when an optical short pulse exited from the optical fiber delivery system is converted into a down-chirped (red-shifted chirped) pulse, there may be obtained an optical short pulse with a desired temporal width having high peak power at a desired position in the optical apparatus.

However, in the optical fiber delivery system for delivering optical short pulses according to JP 2008-268589 A, the negative group-velocity dispersion generation unit generates, in addition to the negative GVD effect, a group-velocity dispersion slope (GVDS), which is a higher-order dispersion component. If the optical waveguide unit or the optical fiber is increased in length with the result that the amount of positive GVD in the optical short pulse delivery system is increased, the amount of negative GVD to be generated also needs to be increased accordingly in order to compensate the positive GVD. When the negative GVD is generated in larger amount by the negative group-velocity dispersion generation unit, the GVDS is also generated in larger amount accordingly.

However, the amount of the GVDS as a higher-order dispersion component is difficult to compensate in consideration of the high cost and complicated method involved therein. Accordingly, the temporal waveform of an optical short pulse is affected by the residual GVDS that has remained without being compensated, and deformed in a complicated manner (with ringing or the like being generated), resulting in a reduction in peak power. As a result, for example, in a nonlinear optical microscope such as a multiphoton fluorescence microscope, the microscope image is reduced in brightness.

FIGS. 21(A) to 21(E) show temporal waveforms (upper side) and spectral widths (lower side) of an optical short pulse in the portions ((A) to (E)) of the optical fiber delivery system for delivering optical short pulses of FIG. 20, respectively, which are to be obtained when an incident optical short pulse is assumed to have high peak power. The broken lines on the temporal waveforms in the upper side each indicate a chirp. As illustrated in FIG. 21, an optical short pulse having high peak power is incident on the optical waveguide unit 220 (FIG. 21(A)), where the interaction between the positive GVD effect and the SPM effect in the optical waveguide broadens the spectral width of the optical short pulse, so that the optical pulse is converted into an up-chirped (blue-shifted chirped) pulse (FIG. 21 (B)). In general, an optical short pulse having higher peak power is more affected by the SPM effect, so that the spectral width of the optical short pulse is further broadened.

When the optical pulse with a broadened spectral width is incident on the negative group-velocity dispersion generation unit 230 such as diffraction gratings, the negative GVD effect of the negative group-velocity dispersion generation unit 230 converts the optical pulse a down-chirped pulse (FIG. 21(C)). In general, an optical pulse having a broader spectral width receives a stronger GVD effect from the negative group-velocity dispersion generation unit such as a diffraction grating. When the spectral width is broad, the influence of higher-order dispersion of third-order or more can no longer be ignorable.

The down-chirped pulse (FIG. 21($c$)) exited from the negative group-velocity dispersion generation unit 230 can pass through the optical fiber 240, so that the interaction between the positive GVD effect and the SPM effect of the optical fiber 240 makes the temporal pulse width and the spectral width narrower, resulting in a down-chirped pulse, as long as there is no waveform distortion resulting from the higher-order dispersion of third-order or more. However, when the waveform distortion resulting from the higher-order dispersion is too large to ignore, the temporal waveform suffers a complicated distortion such as ringing (FIG. 21 (D)).

For this reason, as compared to a case where no higher-order dispersion is included, high peak power still cannot be obtained because of the waveform distortion such as ringing, even after the optical pulse has been incident on the optical apparatus 250 to receive GVD effect in the optical apparatus 250 (FIG. 21(E)). The waveform distortion resulting from the higher-order dispersion is difficult to compensate in consideration of the high cost and complicated method involved therein.

Further, according to the optical fiber delivery system disclosed in U.S. Pat. No. 6,249,630, an optical short pulse is provided with a large GVD effect in advance so as to reduce the peak power of the optical short pulse so that the SPM effect in the optical fiber can be made mostly ignorable. The optical pulse that has been thus reduced in peak power is then caused to be incident on the optical fiber.

However, in order to reduce the peak power to a level low enough that the SPM effect in the optical fiber can be made mostly ignorable, the optical short pulse needs to be provided with the GVD effect that is extremely large, which may result in an increase in size of an optical element for providing the GVD effect, causing inconvenience in terms of physical arrangement. Further, it is necessary to dispose optical elements for providing the GVD effect, upstream and downstream of the optical fiber, with the result that the advantage of the optical fiber, that is, the degree of freedom in arrangement, is significantly impaired.

Means for Solving the Problems

According to a first aspect of the present invention, there is provided an optical fiber delivery system for delivering optical short pulses, including:

a chirped pulse source for emitting an up-chirped optical short pulse having high peak power;

an optical waveguide unit for delivering the optical short pulse emitted from the chirped pulse source;

a negative group-velocity dispersion generation unit for providing negative group-velocity dispersion to the optical short pulse exited from the optical waveguide unit; and an optical fiber for delivering the optical short pulse exited from the negative group-velocity dispersion generation unit, along a desired distance, in which the optical short pulse emitted from the chirped pulse source is adapted to be exited, from the optical fiber, as a down-chirped optical short pulse that is substantially free of waveform distortion resulting from higher-order dispersion.

According to a second aspect of the present invention, in the optical fiber delivery system for delivering optical short pulses according to the first aspect, the chirped pulse source includes:

an ultrashort optical pulse source for emitting an ultrashort optical pulse; and a positive group-velocity dispersion generation unit for providing positive group-velocity dispersion to the ultrashort optical pulse emitted from the ultrashort optical pulse source, and outputting the ultrashort optical pulse as an up-chirped optical short pulse that is smaller in peak power than the ultrashort optical pulse.

According to a third aspect of the present invention, in the optical fiber delivery system for delivering optical short pulses according to the first aspect, the optical waveguide unit has a positive group-velocity dispersion value.

According to a fourth aspect of the present invention, in the optical fiber delivery system for delivering optical short pulses according to the first aspect, the optical fiber has a positive group-velocity dispersion value.

According to a fifth aspect of the present invention, the optical fiber delivery system for delivering optical short pulses according to the first aspect further includes, downstream of the optical fiber, a positive group-velocity dispersion addition unit for providing positive group-velocity dispersion to the optical short pulse exited from the optical fiber so as to output the optical short pulse as a down-chirped pulse having a lower rate of the instantaneous frequency change than that of the optical short pulse.

According to a sixth aspect of the present invention, in the optical fiber delivery system for delivering optical short pulses according to the first aspect, the negative group-velocity dispersion generation unit has a negative group-velocity dispersion amount adjustment mechanism for adjusting the amount of negative group-velocity dispersion.

According to a seventh aspect of the present invention, in the optical fiber delivery system for delivering optical short pulses according to the second aspect, the positive group-velocity dispersion generation unit has a positive group-velocity dispersion amount adjustment mechanism for adjusting the amount of positive group-velocity dispersion.

According to an eighth aspect of the present invention, in the optical fiber delivery system for delivering optical short pulses according to the fifth aspect, the positive group-velocity dispersion addition unit has a positive group-velocity dispersion addition amount adjustment mechanism for adjusting the amount of positive group-velocity dispersion.

According to a ninth aspect of the present invention, there is provided an optical fiber delivery method of delivering optical short pulses, including the steps of:

causing an up-chirped optical short pulse having high peak power to be incident on an optical waveguide unit;

delivering the optical short pulse using the optical waveguide unit;

providing negative group-velocity dispersion using a negative group-velocity dispersion generation unit, to the optical short pulse exited from the optical waveguide unit;

delivering the optical short pulse exited from the negative group-velocity dispersion generation unit, along a desired distance using an optical fiber; and outputting, from the optical fiber, the optical short pulse as a down-chirped optical short pulse that is substantially free of waveform distortion resulting from higher-order dispersion.

In order to attain the above-mentioned object, according to a tenth aspect of the present invention, there is provided an optical fiber delivery system for delivering optical short pulses including:

a nonlinear effect generation unit for receiving an optical short pulse having high peak power, and providing a nonlinear effect and a dispersion effect to the optical short pulse;

a negative group-velocity dispersion generation unit for providing negative group-velocity dispersion to the optical short pulse exited from the nonlinear effect generation unit; and an optical fiber for delivering the optical short pulse exited from the negative group-velocity dispersion generation unit, along a desired distance, in which the optical short pulse that has been incident on the nonlinear effect generation unit is exited as a down-chirped optical short pulse from the optical fiber, and the nonlinear effect generation unit is configured to satisfy the following conditional expression (4):

[Expression 3]

$$L_{NL} \leq L \leq 8L_{opt} \quad (4)$$

where, $$L_{NL} = \frac{1}{\gamma P_0}$$

$$L_{opt} = \sqrt{6L_D L_{NL}}$$

$$L_D = \frac{T_0^2}{|\beta_2|}$$

in which: L represents a physical length of a medium forming the nonlinear effect generation unit;

$\gamma$ represents a nonlinear coefficient of the medium forming the nonlinear effect generation unit;

$P_0$ represents peak power of the optical short pulse incident on the nonlinear effect generation unit;

$T_0$ represents a temporal half-width of the optical short pulse incident on the nonlinear effect generation unit, when the output intensity of the optical short pulse becomes 1/e of the peak power; and $\beta_2$ represents a group-velocity dispersion value of the nonlinear effect generation unit.

According to an eleventh aspect of the present invention, in the optical fiber delivery system for delivering optical short pulses according to the tenth aspect, the physical length of the medium forming the nonlinear effect generation unit is 0.5 $L_{opt}$ or more.

According to a twelfth aspect of the present invention, in the optical fiber delivery system for delivering optical short pulses according to the tenth or eleventh aspect, the nonlinear effect generation unit satisfies the following conditional expression:

[Expression 4]

$$L \cong \sqrt{6L_D L_{NL}} \quad (5)$$

where, $$L_D = \frac{T_0^2}{|\beta_2|}$$

$$L_{NL} = \frac{1}{\gamma P_0}$$

in which: $T_0$ represents a temporal half-width of the optical short pulse incident on the nonlinear effect generation unit when the output intensity of the optical short pulse becomes 1/e of the peak power;

$\beta_2$ represents a group-velocity dispersion value of the nonlinear effect generation unit;

$\gamma$ represents a nonlinear coefficient of the medium forming the nonlinear effect generation unit; and $P_0$ represents peak power of the optical short pulse incident on the nonlinear effect generation unit.

According to a thirteenth aspect of the present invention, the optical fiber delivery system for delivering optical short pulses according to the tenth aspect further includes, upstream of the nonlinear effect generation unit, a chirped pulse source for emitting an up-chirped optical short pulse having high peak power.

According to a fourteenth aspect of the present invention, the optical fiber delivery system for delivering optical short pulses according to the tenth aspect further includes, upstream of the nonlinear effect generation unit, a nonlinear effect adjustment unit for adjusting the amount of the nonlinear effect to be generated by the nonlinear effect generation unit.

According to a fifteenth aspect of the present invention, in the optical fiber delivery system for delivering optical short pulses according to the tenth aspect, the nonlinear effect generation unit has a positive group-velocity dispersion value.

According to a sixteenth aspect of the present invention, in the optical fiber delivery system for delivering optical short pulses according to the tenth aspect, the optical fiber has a positive group-velocity dispersion value.

According to a seventeenth aspect of the present invention, there is provided an optical fiber delivery method of delivering optical short pulses including the steps of:

receiving an optical short pulse having high peak power, and transmitting the optical short pulse through the nonlinear effect generation unit, to thereby provide a nonlinear effect and a dispersion effect to the optical short pulse;

providing negative group-velocity dispersion to the optical short pulse exited from the nonlinear effect generation unit;

delivering the optical short pulse provided with the negative group-velocity dispersion, along a desired distance using an optical fiber; and outputting, from the optical fiber, the optical short pulse as a down-chirped optical short pulse, in which the nonlinear effect generation unit satisfies the following conditional expression:

[Expression 5]

$$L_{NL} \le L \le 8L_{opt} \quad (4)$$

where $$L_{NL} = \frac{1}{\gamma P_0}$$

$$L_{opt} = \sqrt{6L_D L_{NL}}$$

$$L_D = \frac{T_0^2}{|\beta_2|}$$

in which: L represents a physical length of a medium forming the nonlinear effect generation unit;
$\gamma$ represents a nonlinear coefficient of the medium forming the nonlinear effect generation unit;
$P_0$ represents peak power of the optical short pulse incident on the nonlinear effect generation unit;
$T_0$ represents a temporal half-width of the optical short pulse incident on the nonlinear effect generation unit, when the output intensity of the optical short pulse becomes 1/e of the peak power; and
$\beta_2$ represents a group-velocity dispersion value of the nonlinear effect generation unit.

BEST MODES FOR CARRYING OUT THE INVENTION

In the following, embodiments of the present invention are described with reference to the drawings.

First Embodiment

Figure 1:
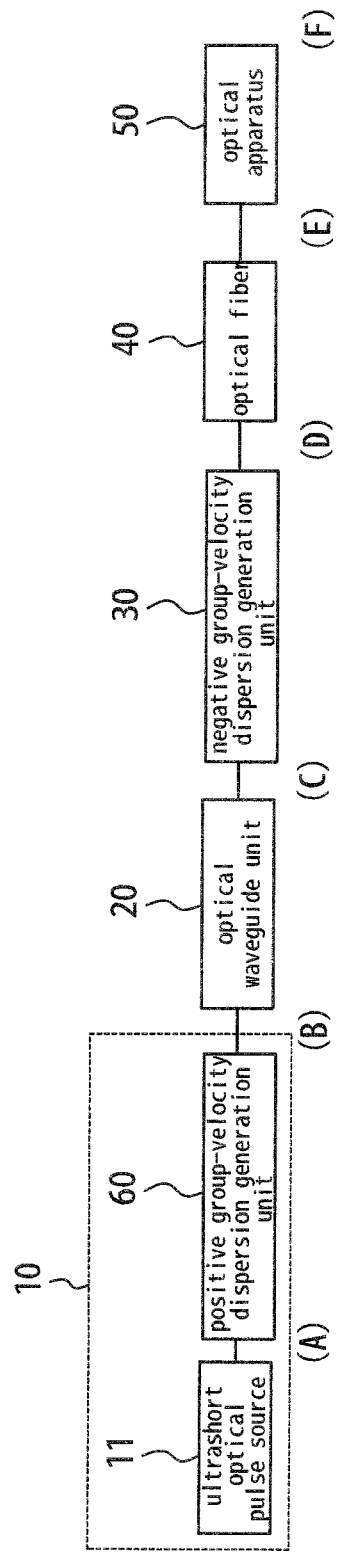
FIG. 1 is a block diagram illustrating a schematic configuration of an optical system having an optical fiber delivery system for delivering optical short pulses according to a first embodiment of the present invention.
Figure 2:
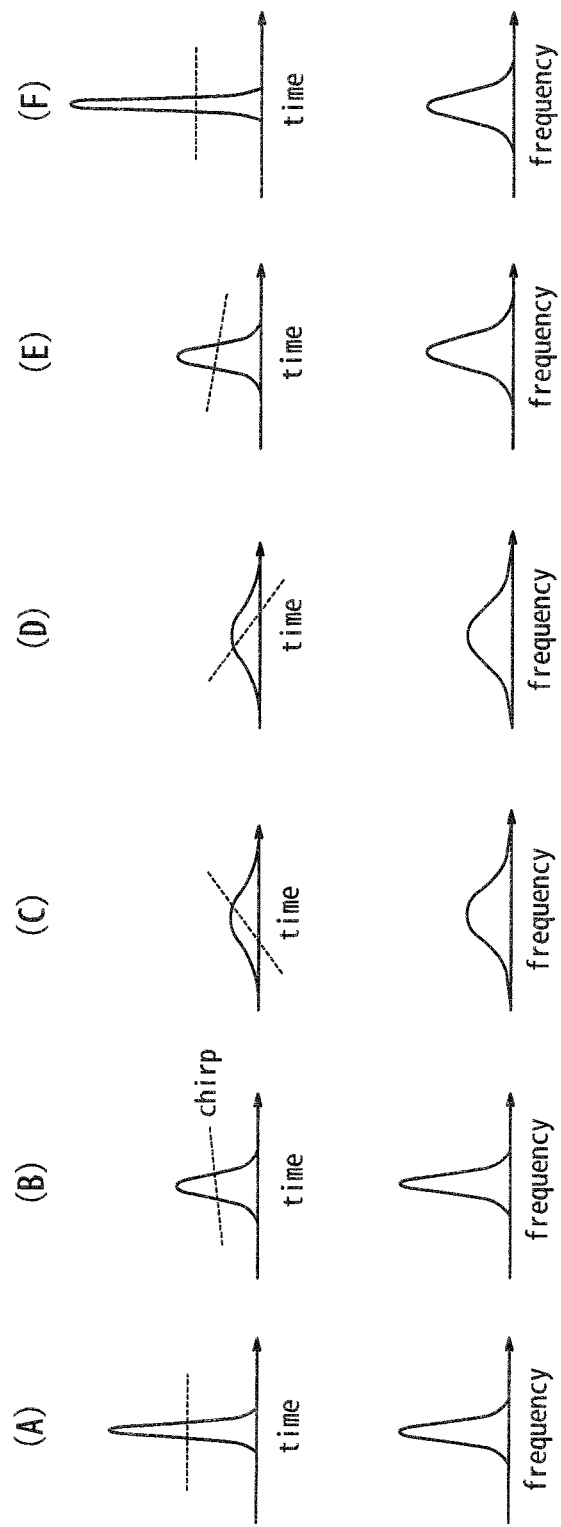
FIGS. 2(A) to 2(F) show temporal waveforms (upper side) and spectral waveforms (lower side) of an optical pulse in respective portions of FIG. 1.

FIGS. 1 and 2(A) to 2(F) each illustrate a first embodiment of the present invention. FIG. 1 is a block diagram illustrating a schematic configuration of an optical system having an optical fiber delivery system for delivering optical short pulses, and FIGS. 2(A) to 2(F) show temporal waveforms (upper side) and spectral waveforms (lower side) of an optical pulse in the portions (A) to (F) of FIG. 1, respectively. In FIG. 2, the broken lines on the temporal waveforms on the upper side each indicate a chirp.

The optical system according to this embodiment includes: a chirp pulse source 10; optical waveguide unit 20; negative group-velocity dispersion generation unit 30; an optical fiber 40; and an optical apparatus 50 that has positive GVD and uses optical short pulses.

The chirped pulse source 10 includes an ultrashort optical pulse source 11 and positive group-velocity dispersion generation unit 60. The ultrashort optical pulse source 11 employs an optical pulse source that generates ultrashort optical pulses close to the transform limit (TL) of high peak power, such as a titanium:sapphire laser, a mode-locked rare earth doped optical fiber laser, a mode-locked semiconductor laser, and a grain-switched semiconductor laser. Further, any one of the above lasers may be combined with an optical amplifier so as to produce ultrashort optical pulses each having, for example, a pulse width narrower than 100 picoseconds. The positive group-velocity dispersion generation unit 60 is configured by including, for example, a light transmission substrate such as a glass rod, a lens, an acousto-optic modulator, an electro-optic modulator, a diffraction grating, and a prism, each having positive group-velocity dispersion (GVD).

An ultrashort optical pulse having high peak power from the ultrashort optical pulse source 11 shown in FIG. 2(A) passes through the positive group-velocity dispersion generation unit 60, where the optical pulse is converted into an up-chirped pulse having a broadened temporal width and reduced peak power as illustrated in FIG. 2(B). The up-chirped pulse is then emitted from the chirped pulse source 10.

The optical waveguide unit 20 is configured by including, for example, any one of the following optical fibers having a positive GVD value at the wavelength of the optical pulse: a single-mode optical fiber; a multi-mode optical fiber; a dispersion compensation fiber; a photonic crystal fiber (PCF); an amplifying optical fiber; a waveguide semiconductor optical amplifier; a planar optical waveguide; and a gradient index lens.

The up-chirped optical short pulse from the chirped pulse source 10 shown in FIG. 2(B) passes through the optical waveguide unit 20, where the interaction between the positive GVD effect and the SPM effect of the optical waveguide unit 20 broadens the pulse width and the spectral width as illustrated in FIG. 2(C), so that the optical pulse is converted into an up-chirped pulse having further reduced peak power and a higher rate of the instantaneous frequency change. Here, the up-chirped optical short pulse incident on the optical waveguide unit 20 is lower in peak power than a pulse closer to the transform limit (TL), and hence, the up-chirped pulse exited from optical waveguide unit 20 has a spectral width less broadened by the nonlinear effect, as compared to the case where the TL pulse has been incident.

The up-chirped optical pulse exited from the optical waveguide unit 20 is then incident on the negative group-velocity dispersion generation unit 30. The negative group-velocity dispersion generation unit 30 is configured by including, for example, any one of the following optical components providing negative GVD at the wavelength of the optical pulse: a pair of diffraction gratings; a pair of prisms; a chirped fiber Bragg grating (CFBG); a Gires-Tournois (GT) interferometer; a virtually imaged phased array (VIPA)-type dispersion compensator; an arrayed waveguide grating (AWG); a liquid crystal spatial light modulator; a hollow core optical fiber; and a photonic crystal fiber.

The up-chirped pulse from the optical waveguide unit 20 passes through the negative group-velocity dispersion generation unit 30, where the negative GVD effect of the negative group-velocity dispersion generation unit 30 converts the optical pulse into a down-chirped pulse as illustrated in FIG. 2(D). Here, the up-chirped pulse incident on the negative group-velocity dispersion generation unit 30 has a spectral width kept narrow, and hence an effect of higher-order dispersion of third-order or more can be suppressed to a level that can be ignored. The amount of negative GVD provided to the optical pulse by the negative group-velocity dispersion generation unit 30 is adjusted in such a manner that the optical pulse is sufficiently recompressed at a desired point in the optical apparatus 50.

The down-chirped optical pulse exited from the negative group-velocity dispersion generation unit 30 then is incident on the optical fiber 40. The optical fiber 40 is for delivering optical pulses along a desired distance, and configured by including, for example, any one of the following optical fibers having a positive GVD value at the wavelength of the optical pulse: a single-mode optical fiber; a multi-mode optical fiber; a dispersion compensation fiber; a photonic crystal fiber; and an amplifying optical fiber. The optical power incident on the optical fiber 40 is usually smaller than the optical power incident on the optical waveguide unit 20 because of various optical losses. Therefore, the ratio of the nonlinear optical coefficient to the GVD value of the optical fiber 40 is often preferably equal to or greater than that of the optical waveguide unit 20.

The down-chirped pulse from the negative GVD generation unit 30 passes through the optical fiber 40, where the interaction between the positive GVD effect and the SPM effect of the optical fiber 40 makes both the temporal pulse width and the spectral width narrower, as illustrated in FIG. 2(E), than those of the incident pulse shown in FIG. 2(D), resulting in a down-chirped pulse having higher peak power and less chirps. That is, a down-chirped pulse exited from the optical fiber 40 has a lower rate of the instantaneous frequency change than that of the down-chirped pulse incident from the negative group-velocity dispersion generation unit 30. Further, the down-chirped pulse of FIG. 2(D) is substantially unaffected by the higher-order dispersion of third-order or more, and hence the down-chirped pulse of FIG. 2(E) undergoes no waveform distortion such as ringing, or merely undergoes an extremely small distortion. Here, an optical pulse that is substantially unaffected by the higher-order dispersion unit that the optical short pulse can be temporally compressed without having a local maximum and minimum values such as ringing resulting from the higher-order dispersion in the temporal waveform of the optical short pulse, or the effect due to the higher-order dispersion with respect to the optical apparatus downstream is small enough to be ignored.

The optical pulse exited from the optical fiber 40 is lastly incident on the optical apparatus 50. The optical apparatus 50 is, for example, a laser-scanning microscope (LSM) or an endoscope for biological specimen observation.

Thus, the GVD effect of the optical system in the optical apparatus 50 makes the optical pulse temporal width of the down-chirped pulse from the optical fiber 40 even narrower whereas the spectral width thereof remains substantially unchanged as shown in FIG. 2(F), so that the optical pulse is temporally recompressed at a desired position, that is, for example, on a biological specimen, to a level equal to or higher than that of the ultrashort optical pulse emitted from the ultrashort optical pulse source 11, and also increased in peak power. Further, there occurs substantially no waveform distortion such as ringing, which is otherwise caused by the higher-order dispersion of third-order or more. Therefore, deep sites of a biological specimen can be observed with sufficient brightness.

Figure 3:
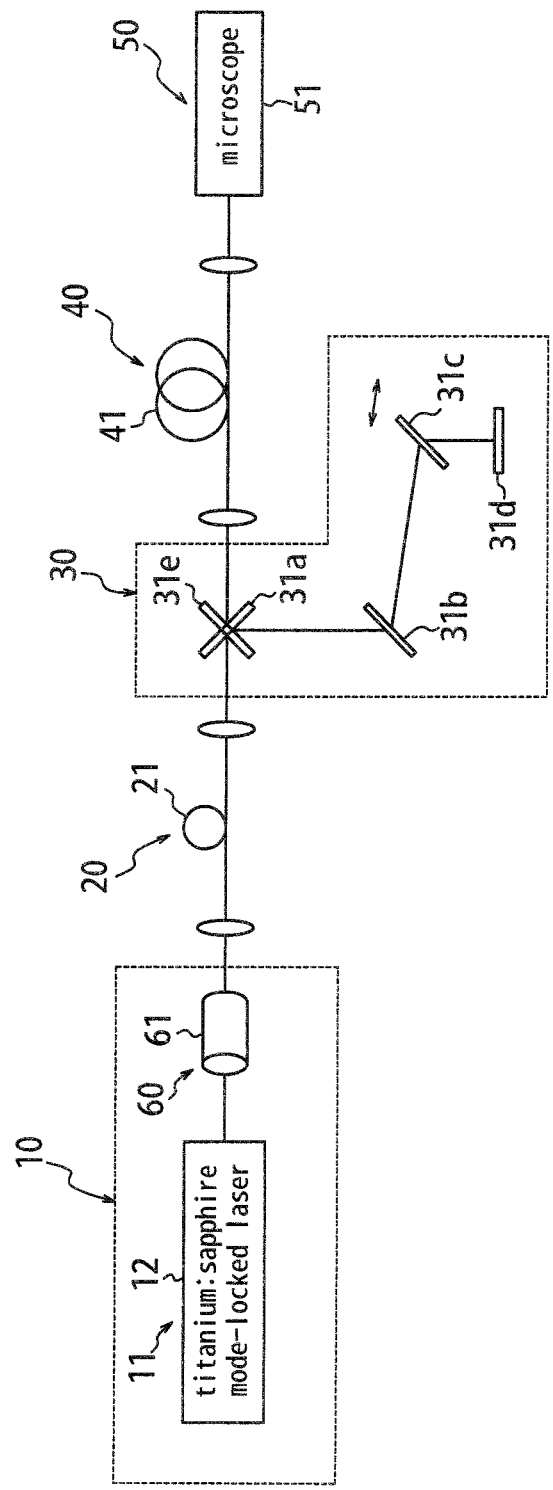
FIG. 3 is a diagram illustrating a specific configuration example of the optical system having the optical fiber delivery system for delivering optical short pulses of FIG. 1.

FIG. 3 is a diagram illustrating a specific configuration example of the optical system having the optical fiber delivery system for delivering optical short pulses of FIG. 1 applied to a microscope. This optical system employs, as the ultrashort optical pulse source 11, a titanium:sapphire mode-locked laser 12 that produces ultrashort optical pulses each having an oscillation wavelength of approximately 800 nm, a pulse width of approximately 500 fs (femtoseconds), a repetition rate of 80 MHz, a spectral width of approximately 9.4 nm, and an average optical output power of approximately 2 W.

Further, the positive group-velocity dispersion generation unit 60 employs a glass rod 61 formed of a glass material (SF10) of 60 mm in length, having a GV value of approximately $1.55 \times 10^{-4}$ ps$^2$ mm$^{-1}$ and a GVD of approximately 0.01 ps$^2$. Here, with the use of the glass rod 61 having an appropriate GVD, the peak power of an optical short pulse can be increased to its maximum on a microscope specimen.

Figure 4:
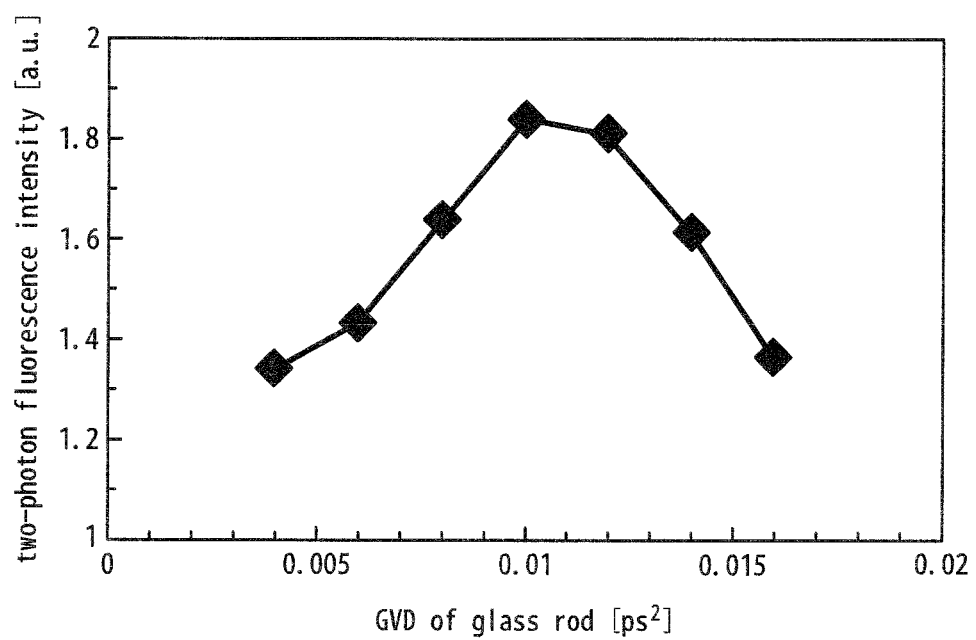
FIG. 4 is a graph showing the two-photon fluorescence intensity on a microscope specimen surface, with respect to the GVD of the glass rod in the optical system of FIG. 3.

FIG. 4 is a graph showing the two-photon fluorescence intensity on a microscope specimen surface, with respect to the GVD of the glass rod 61 in the optical system of FIG. 3, in which the GVD of the glass rod 61 is plotted on the abscissa while the two-photon fluorescence intensity is plotted on the ordinate. In the graph, the two-photon fluorescence intensity reaches its maximum at the GVD of 0.01 ps$^2$. The GVD of the glass rod 61 can be adjusted by changing the length of the glass rod.

Further, the optical waveguide unit 20 is formed of a large-mode area photonic crystal fiber (LMA-PCF) 21 that has a GVD value of about 36 ps$^2$ km$^{-1}$, a nonlinear optical coefficient of approximately 1.7 W$^{-1}$ km$^{-1}$, in a wavelength range of 800 nm with a fiber length of 1 m.

The negative group-velocity dispersion generation unit 30 includes: a mirror 31a; diffraction gratings 31b, 31c; and rectangular mirrors 31d and 31e, and is configured in such a manner that an optical short pulse exited from the LMA-PCF 21 is deflected by the mirror 31a and sequentially diffracted by the diffraction gratings 31b and 31c, and then reversed in optical path by the rectangular mirror 31d so as to be transmitted via the diffraction gratings 31c, 31b, and the rectangular mirror 31e to be exited therefrom. This configuration provides the GVD of about $-0.16$ ps$^2$ and the GVDS of about 0.00033 ps$^3$. Here, the GVDS is an amount of third-order dispersion. The diffraction grating 31c is adjustable in position, and the GVD can be varied through the adjustment of the position. For this reason, the negative group-velocity dispersion generation unit 30a has a negative group-velocity dispersion amount adjustment mechanism that is configured by including the diffraction grating 31c.

The optical fiber 40 is formed of a large-mode area photonic crystal fiber (LMA-PCF) 41 that has a GVD value of about 36 ps$^2$ km$^{-1}$ and a nonlinear optical coefficient of approximately 1.7 W$^{-1}$ km$^{-1}$, in a wavelength range of 800 nm with a fiber length of 3 m. Further, the optical apparatus 50 employs a microscope 51 having a GVD of about 0.01 ps$^2$.

The above-mentioned configuration of the optical system provides, on the microscope specimen, an ultrashort optical pulse that has a wavelength in a range of about 800 nm and an optical pulse width of about 100 fs or less, in which the effect of the waveform distortion resulting from the higher-order dispersion of third-order or more is suppressed to a level that can be substantially ignored. Further, although the pulse width and the spectral width are changed due to the interaction between the GVD effect and the SPM effect when the pulse passes through the LMA-PCF 21, those changes are compensated when the pulse passes through the LMA-PCF 41 similarly using the interaction between the GVD effect and the SPM effect, to thereby substantially restore the pulse width and the spectral width to original state. Accordingly, there is no need to dispose a large optical element for providing a large GVD effect in order to avoid the nonlinear effect, upstream and downstream of the LMA-PCF 41. Therefore, the LMA-PCF 41 can be arranged with a high degree of freedom.

As described above, the optical fiber delivery system for delivering optical short pulses according to this embodiment is configured in such a manner that the chirped pulse source 10 for outputting up-chirped optical short pulses is used so that the up-chirped optical short pulses are delivered via the LMA-PCF 21 and the negative group-velocity dispersion generation unit 30 so as to be exited, as the down-chirped pulses substantially free from a waveform distortion resulting from higher-order dispersion of third-order or more, from the LMA-PCF 41 to the microscope 51. Thus, the optical fiber delivery system for delivering optical short pulses according to this embodiment is capable of efficiently delivering optical short pulses having high peak power to a desired position in an optical apparatus while reducing the effect of the waveform distortion resulting from the higher-order dispersion, and also has a high degree of freedom in arrangement.

Second Embodiment

Figure 5:
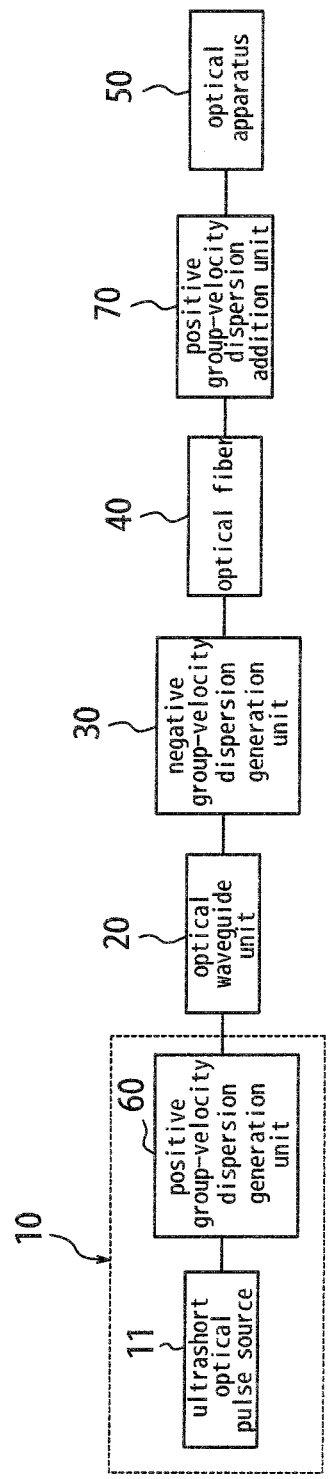
FIG. 5 is a block diagram illustrating a schematic configuration example of art optical system having an optical fiber delivery system for delivering optical short pulses according to a second embodiment of the present invention.

FIG. 5 is a block diagram illustrating a schematic configuration of an optical system having an optical fiber delivery system for delivering optical short pulses according to a second embodiment of the present invention. In this embodiment, positive group-velocity dispersion addition unit 70 for providing a positive GVD effect is disposed between the optical fiber 40 and the optical apparatus 50 of the first embodiment in order to adjust the down chirp of the optical short pulse incident on the optical apparatus 50, to thereby obtain an ultrashort optical pulse having high peak power and a desired temporal width at a desired position in the optical apparatus 50. Here, the positive group-velocity dispersion addition unit 70 is configured by including, for example, any one of the following optical components: a light-transmitting substrate such as a glass rod; a lens; an acousto-optic modulator; a diffraction grating; and a prism.

The positive group-velocity dispersion addition unit 70 is provided so that the chirp of each of the optical short pulses incident on the optical apparatus 50 can be adjusted, so as to obtain a pulse having high peak power at a desired position such as a specimen surface of a microscope or an endoscope. As a result, nonlinear effects, such as two-photon fluorescence, can be generated with higher efficiency on the specimen surface, and a bright image can be obtained.

The positive group-velocity dispersion addition unit 70 may further include an adjustment mechanism. For example, when the optical fiber delivery system for delivering optical short pulses according to this embodiment is applied to a microscope in which a plurality of objective lenses are interchangeably used according to the image magnification, the GVD varies when the objective lenses are interchanged because the glass materials forming the objective lenses and the thickness of the objective lenses are different from one another. For this reason, it is preferred that the dispersion of the positive group-velocity dispersion addition unit 70 be adjustable according to the dispersion of the microscope objective lens.

Figure 6:
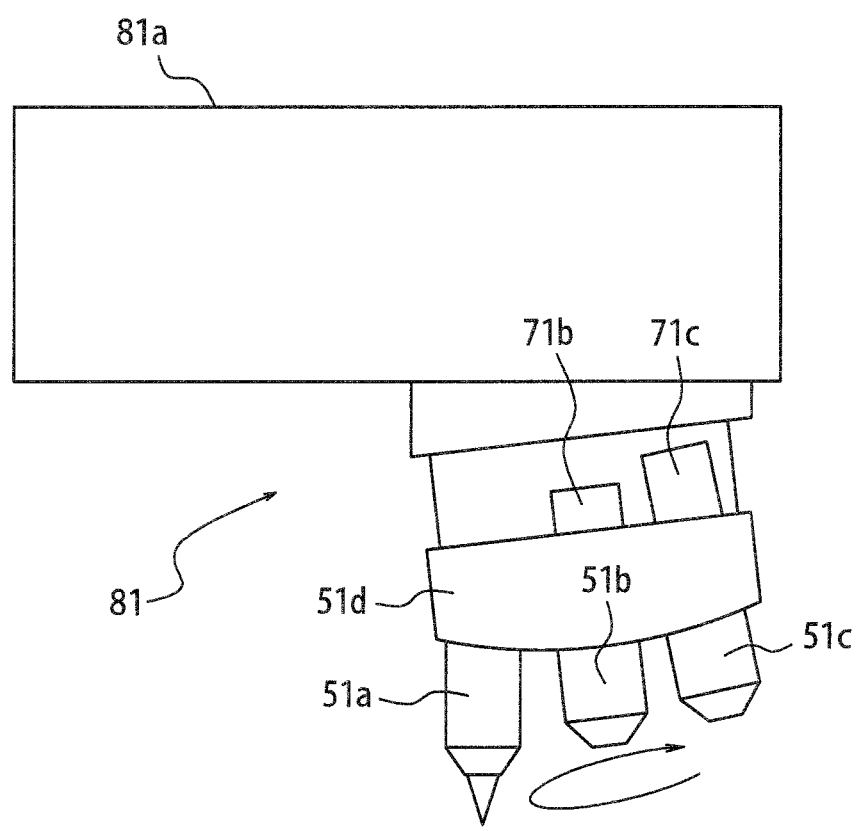
FIG. 6 is a view for illustrating a specific example of the positive group-velocity dispersion addition unit of FIG. 5.

FIG. 6 is a view for illustrating a specific example of the positive group-velocity dispersion addition unit of FIG. 5. The optical fiber delivery system for delivering optical short pulses of this embodiment is applied to a microscope 81. A down-chirped pulse exited from the optical fiber 40 is guided to the microscope main body 81a. The microscope 81 includes a plurality of objective lenses 51a, 51b, and 51c, and is configured in such a manner that the objective lenses 51a, 51b, and 51c for use in microscopic observation can be interchanged using a revolver 51d.

The objective lenses 51b, 51c have glass rods 71b, 71c incorporated therein, respectively, on the incidence side of the optical short pulse. The glass rods 71b, 71c are different from each other in length and each provides an appropriate GVD, so that the objective lenses 51b, 51c can be similarly used as the objective lens 51a without changing the GVD. That is, in FIG. 6, the glass rods 71b, 71c, and the revolver 51d form the positive group-velocity dispersion addition unit 70. Further, the revolver 51d functions as a mechanism for interchanging the objective lenses 51a, 51b, 51c, and also functions as a positive group-velocity dispersion addition amount adjustment mechanism.

As described above, according to this embodiment, the glass rods 71b, 71c for providing a positive GVD effect are disposed between the optical fiber and the objective lenses, and hence, in addition to the effect of the first embodiment, the down chirp of the incident optical short pulse is adjusted, to thereby obtain an ultrashort optical pulse having high peak power and a desired temporal width at a desired position, namely, a specimen surface of a microscope. Further, with the use of the revolver 51d, the optical system can be configured without glass rod or with any of the glass rods 71b, 71c that are interchangeably used, so as to add an appropriate GVD to the objective lens 51a, 51b, 51c depending on the dispersion of each lens, to thereby always obtain an optical short pulse having high peak power on a sample surface with any of the objective lenses.

Third Embodiment

Figure 7:
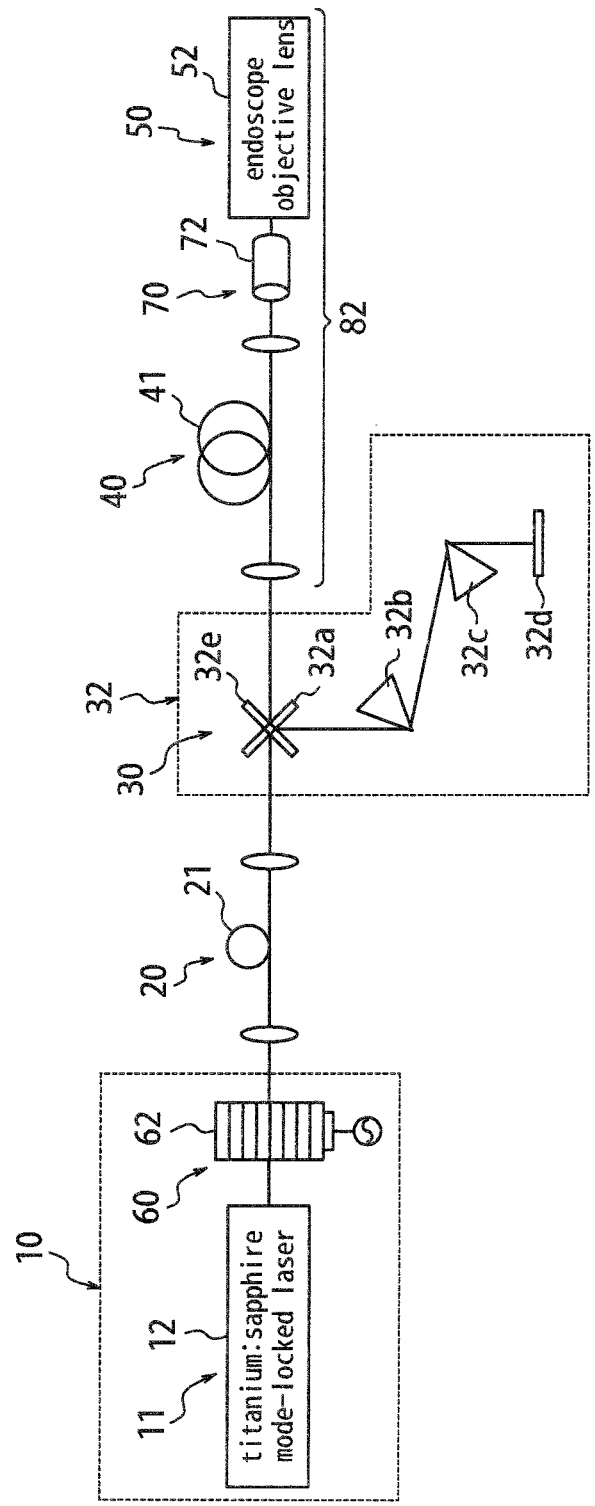
FIG. 7 is a diagram illustrating a configuration of an optical system having an optical fiber delivery system for delivering optical short pulses according to a third embodiment of the present invention.

FIG. 7 is a diagram illustrating a configuration of an optical system having an optical fiber delivery system for delivering optical short pulses according to a third embodiment of the present invention. In this embodiment, the optical fiber delivery system for delivering optical short pulses of FIG. 5 is applied to an endoscope. This optical system employs, as the ultrashort optical pulse source 11, a titanium:sapphire mode-locked laser 12 that produces optical pulses each having an oscillation wavelength of approximately 980 nm, a pulse width of approximately 120 fs, a repetition rate of 90 MHz, and an average optical output power of approximately 0.8 W.

Further, the positive group-velocity dispersion generation unit 60 employs an acousto-optic module (AOM) 62. The AOM 62 is capable of converting the up-chirped ultrashort optical pulses emitted from the ultrashort optical pulse source 11 into up-chirped optical short pulses, and also modulating the output intensity thereof.

The optical waveguide unit 20 is formed of an LMA-PCF 21 that has a GVD value of about 23 $ps^2$ $km^{-1}$ and a nonlinear optical coefficient of approximately 1.4 $W^{-1}$ $km^{-1}$, in a wavelength range of 980 nm with a fiber length of 0.2 m.

Further, the negative group-velocity dispersion generation unit 30 includes: a mirror 32a; prisms 32b, 32c; and rectangular mirrors 32d and 32e, and is configured in such a manner that optical short pulses exited from the LMA-PCF 21 are deflected by the mirror 32a and refracted by the prisms 32b, 32c, and then reversed in optical path by the rectangular mirror 32d so as to be transmitted via the prisms 32b, 32c, and the rectangular mirror 32e to be exited therefrom. This configuration provides the GVD of about –0.04 $ps^2$ and the GVDS of about 0.0001 $ps^3$.

The optical fiber 40 is formed of an LMA-PCF 41 that has a GVD value of about 23 $ps^2$ $km^{-1}$ and a nonlinear optical coefficient of approximately 1.4 $W^{-1}$ $km^{-1}$, in a wavelength range of 980 nm with a fiber length of 1 m.

Further, a glass rod 72 serving as the positive group-velocity dispersion addition unit 70 is disposed upstream of an endoscope objective lens 52 serving as the optical apparatus 50. The glass rod 72 is a member formed of a glass material (SF10) of 18 mm in length, having a GVD value of $1.14 \times 10^{-4}$ $ps^2$ $mm^{-1}$ and a GVD of 0.02 $ps^2$. The reason for disposing the glass rod 72 is to ensure the GVD needed to compensate the down-chirped optical pulses exited from the LMA-PCF 41, because the GVD (0.003 $ps^2$) of the endoscope objective lens 52 is small. The sum of the GVD from the titanium:sapphire mode-locked laser 12 to the endoscope objective lens 52 is substantially zero.

The LMA-PCF 41, the glass rod 72, and the endoscope objective lens 52 are arranged in an insertion part of a flexible endoscope 82.

According to this embodiment, the glass rod 72 is disposed between the LMA-PCF 41 and the endoscope objective lens 52, so that the necessary GVD can be ensured even if the GVD of the endoscope objective lens 52 is small, to thereby obtain optical short pulses having high peak power. Further, the AOM 62 is used as the positive group-velocity dispersion generation unit 60, so that, in addition to converting the ultrashort optical pulses emitted from the titanium:sapphire mode-locked laser 12 into up-chirped pulses, the output intensity of the optical short pulses can be set to an appropriate value through intensity modulation.

Fourth Embodiment

Figure 8:
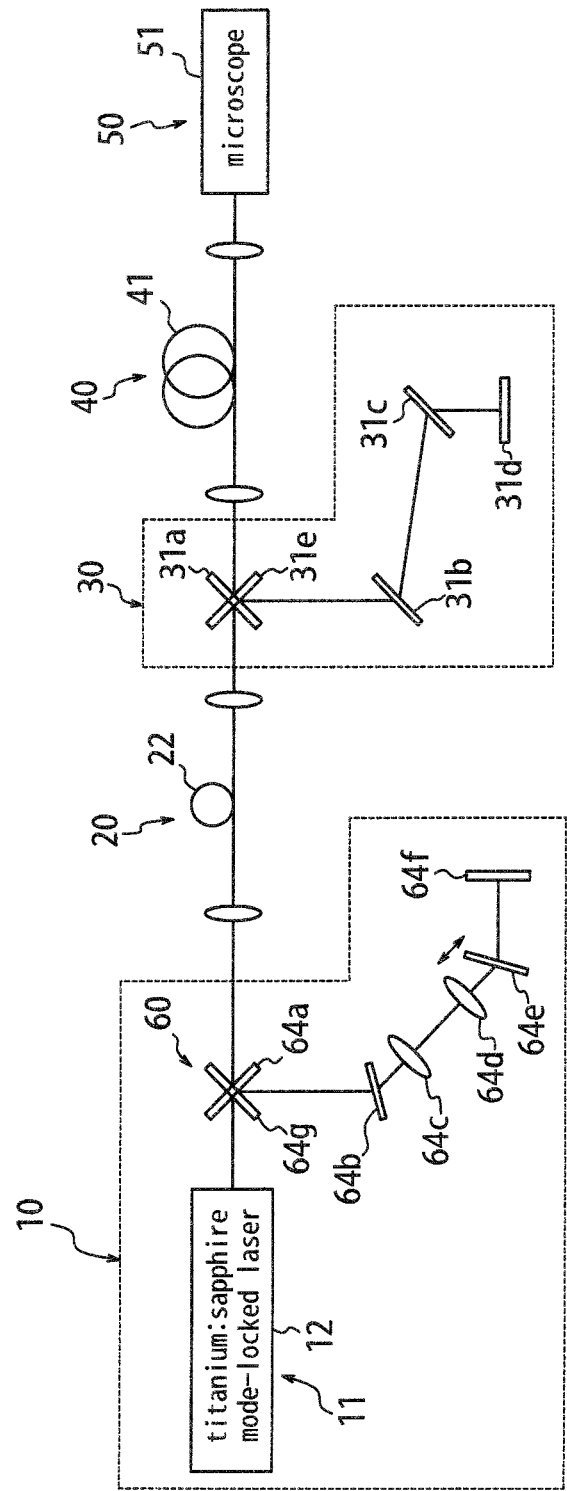
FIG. 8 is a diagram illustrating a configuration of an optical system having an optical fiber delivery system for delivering optical short pulses according to a fourth embodiment of the present invention.

FIG. 8 is a view illustrating a configuration of an optical system having an optical fiber delivery system for delivering optical short pulses according to a fourth embodiment of the present invention. In this embodiment, the glass rod 61 and the LMA-PCF 21 of the first embodiment shown in FIG. 3 are replaced by the positive group-velocity dispersion generation unit 60 including a pair of diffraction gratings 64b, 64e, and a single mode fiber (SMF) 22, respectively.

The positive group-velocity dispersion generation unit 60 includes: a mirror 64a; a diffraction grating 64b; lenses 64c, 64d each having a positive power; a diffraction grating 64e; a rectangular mirror 64f; and a mirror 64g, and is configured in such a manner that the ultrashort optical pulses emitted from the titanium:sapphire mode-locked laser 12 are each deflected by the mirror 64a and diffracted by the diffraction grating 64b, and then reversed in optical path by the rectangular mirror 64f so as to be transmitted via the diffraction grating 64e, the lenses 64d, 64c, the diffraction grating 64b, and the mirror 64g, to be exited therefrom. Here, the lenses 64c, 64d are arranged so as to change the orientation of dispersion to be induced by the diffraction gratings. Further, the diffraction grating 64e can be adjusted in position, so as to allow the positive group-velocity dispersion generation unit 60 to provide the GVD of 0.008 to 0.012 $ps^2$, and the GVDS of 0.000011 to 0.000017 $ps^3$. In other words, the positive group-velocity dispersion generation unit 60 has a positive group-velocity dispersion amount adjustment mechanism that includes the diffraction grating 64e.

Further, the SMF 22 has a GVD value of 40 $ps^2$ $km^{-1}$ and a nonlinear optical coefficient of approximately 5 $W^{-1}$ $km^{-1}$, in a wavelength range of 800 nm with a fiber length of 1 m.

Further, the titanium:sapphire mode-locked laser 12, the negative group-velocity dispersion generation unit 30, the LMA-PCF 41, and the microscope objective lens 51 are different in detailed specification from the specific configuration example of the first embodiment, as described below.

That is, the titanium:sapphire mode-locked laser 12 produces ultrashort optical pulses each having an oscillation wavelength of approximately 800 nm, a pulse width of approximately 70 fs, a repetition rate of approximately 80 MHz, a spectral width of approximately 13.4 nm, and an average optical output power of approximately 2 W. Further, the LMA-PCF 41 has a GVD value of about 36 $ps^2$ $km^{-1}$ and a nonlinear optical coefficient of approximately 1.7 $W^{-1}$ $km^{-1}$, in a wavelength range of 800 nm with a fiber length of 3 m. Still further, the microscope 51 includes a plurality of interchangeable objective lenses each having a GVD falling within a range of 0.008 to 0.012 $ps^2$.

With the above-mentioned configuration, this embodiment is capable of adjusting the positive GVD generated by the positive group-velocity dispersion generation unit 60 even when the GVD has been changed after the interchange of the microscope objective lenses, so that an optical short pulse having high peak power can be efficiently delivered to a desired position in the optical apparatus.

Fifth Embodiment

Figure 9:
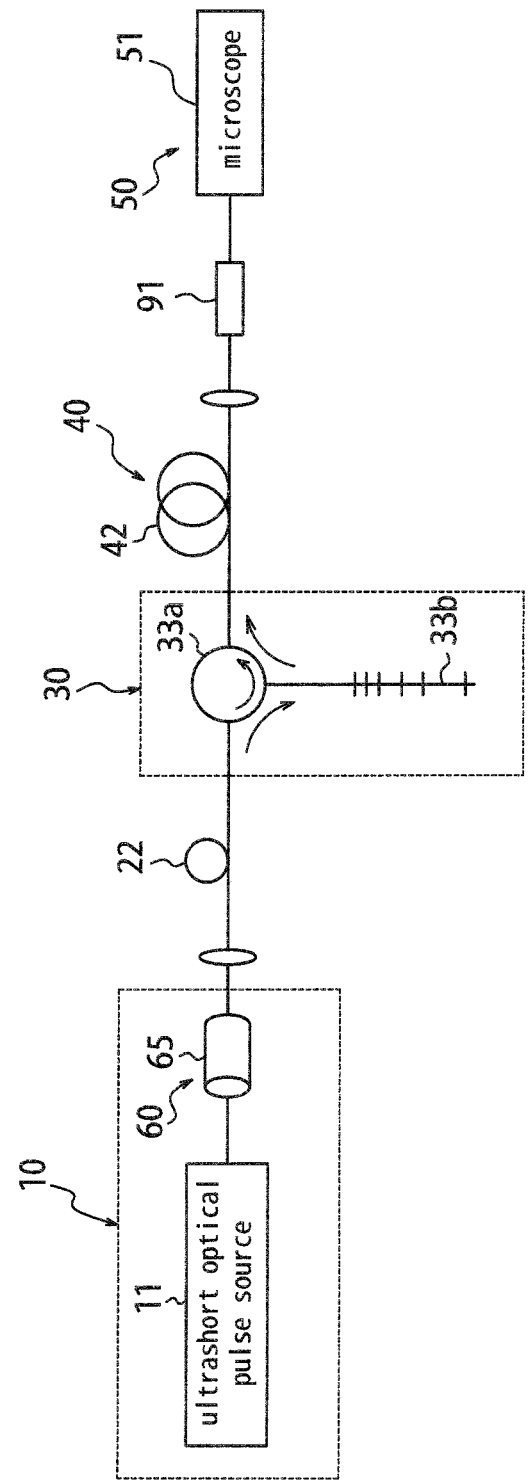
FIG. 9 is a diagram illustrating a configuration of an optical system having an optical fiber delivery system for delivering optical short pulses according to a fifth embodiment of the present invention.

FIG. 9 is a diagram illustrating a configuration of an optical system having an optical fiber delivery system for delivering optical short pulses according to a fifth embodiment of the present invention. In this embodiment, wavelength conversion unit 91 is disposed between the optical fiber 40 and the optical apparatus 50 in the schematic configuration of the optical system of FIG. 1. The specific configuration of each component is described below.

Figure 10:
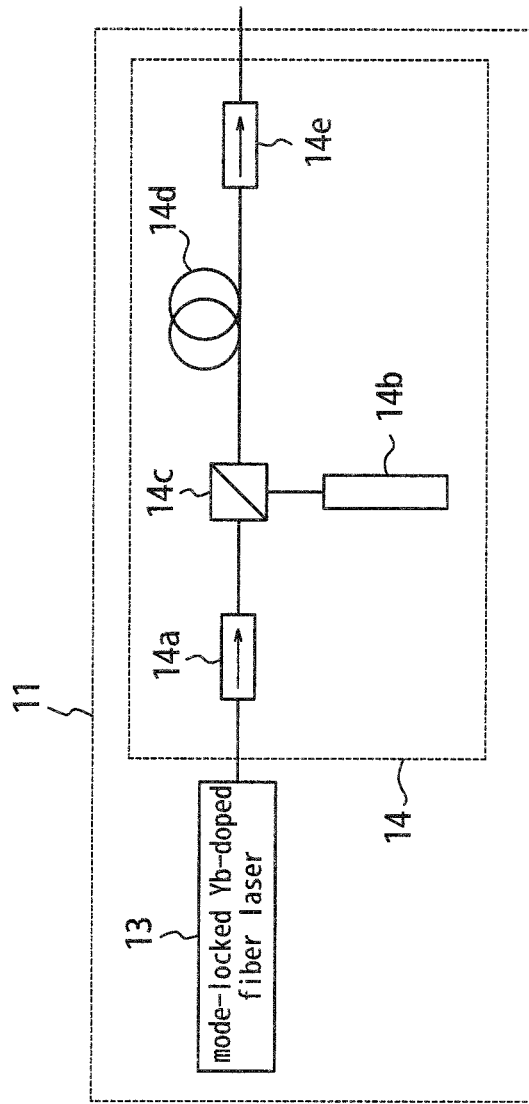
FIG. 10 is a diagram illustrating a specific example of an ultrashort optical pulse source according to the fifth embodiment.

First, the ultrashort optical pulse source 11 employs the pulse source shown in FIG. 10. The ultrashort optical pulse source 11 includes a mode-locked Yb-doped fiber laser 13 and a fiber type optical amplifier 14. The fiber type optical amplifier 14 is configured by including: an isolator 14a; a semiconductor laser 14b, an optical multiplexer 14c; a single-mode Yb-doped fiber 14d; and an isolator 14e. The semiconductor laser 14b emits a laser beam having a wavelength of 978 nm, so as to excite the single-mode Yb-doped fiber 14d via the optical multiplexer 14c. An optical pulse having a wavelength of 1060 nm emitted from the mode-locked Yb-doped fiber laser 13 passes through the isolator 14a and the optical multiplexer 14c to be amplified in the single-mode Yb-doped fiber 14d excited by the laser beam from the semiconductor laser 14b, and is exited from the isolator 14e.

Further, as illustrated in FIG. 9, the positive group-velocity dispersion generation unit 60 employs a glass rod 65 (glass material: SF6) having a length of 46 mm, a GVD value of approximately $1.3 \times 10^{-4}$ $ps^2$ $mm^{-1}$, and a GVD of approximately 0.06 $ps^2$. Further, the optical waveguide unit 20 employs an SMF 22 that has a nonlinear optical coefficient of approximately 5 $W^{-1}$ $km^{-1}$ and a GVD value of 17 $ps^2$ $km^{-1}$, in a wavelength range of 1060 nm with a fiber length of 1 m.

Further, the optical system of this embodiment uses negative group-velocity dispersion generation unit 30 that includes an optical circulator 33a and a fiber Bragg grating (FBG) 33b. The optical circulator 33a is configured to output an optical pulse from the SMF 22 to the FBG 33b, and to output an optical pulse from the FBG 33b to the SMF 42 disposed downstream. The up-chirped optical short pulse exited from the SMF 22 passes through the optical circulator 33a to be incident on the FBG 33b, and is reflected in the FBG 33b so as to again pass through the optical circulator 33a to be output to the SMF 42. The optical short pulse is reflected at a position corresponding to the wavelength in the FBG 33b so as to be provided with a negative GVD, and converted into a down-chirped pulse. The FBG 33b has a GVD of –0.08 $ps^2$ and the GVDS of –0.0002 $ps^3$.

Further, the optical fiber 40 employs an SMF 42 that has a nonlinear optical coefficient of approximately 5 $W^{-1}$ $km^{-1}$ and a GVD value of 17 $ps^2$, in a wavelength range of 1060 nm with a fiber length of 3 m.

Further, the wavelength conversion unit 91 employs periodically poled lithium niobate (PPLN). The wavelength conversion unit 91 converts the wavelength of an optical pulse incident from the SMF 42 from 1060 nm to 530 nm by the second-harmonic generation, and outputs the optical pulse to the microscope 51 serving as the optical apparatus 50 having a GVD of 0.006 $ps^2$.

This embodiment employs the wavelength conversion unit 91, which allows a second-harmonic optical pulse having a shorter wavelength to be exited to the microscope 51. Further, the chirp of the optical short pulse to be exited from the SMF 42 is adjusted so as to increase the peak power of the optical pulse in the wavelength conversion unit 91, to thereby obtain high second-harmonic conversion efficiency. Further, the use of the FBG makes the configuration simpler, eliminating the need to make a complicated adjustment to the optical system and making the arrangement easy.

It should be noted that at least two of the positive group-velocity dispersion generation unit, the negative group-velocity dispersion generation unit, and the positive group-velocity dispersion addition unit may each have a group-velocity dispersion amount adjustment mechanism, and each adjustment mechanism may be adjusted, to thereby obtain an optical short pulse having high peak power at a desired position such as a specimen surface of a microscope or of an endoscope. With this configuration, nonlinear effects, such as two-photon fluorescence, can be generated with higher efficiency, and a bright image can be obtained.

Sixth Embodiment

Figure 11:
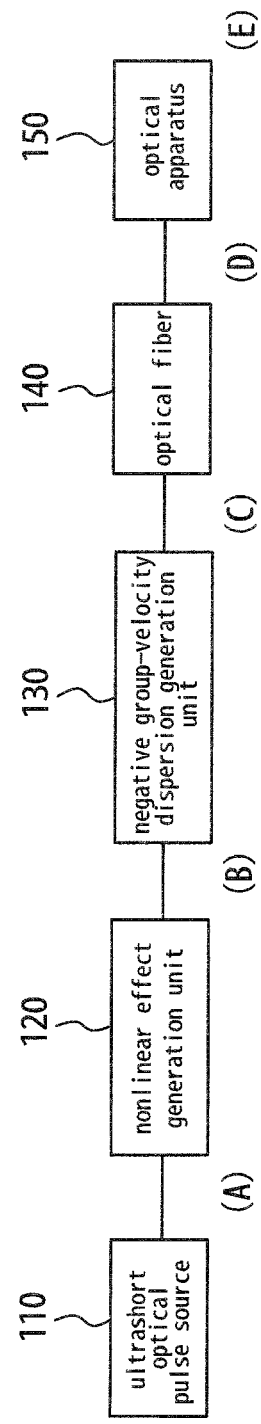
FIG. 11 is a block diagram illustrating a schematic configuration of an optical system having an optical fiber delivery system for delivering optical short pulses according to a sixth embodiment of the present invention.
Figure 12:
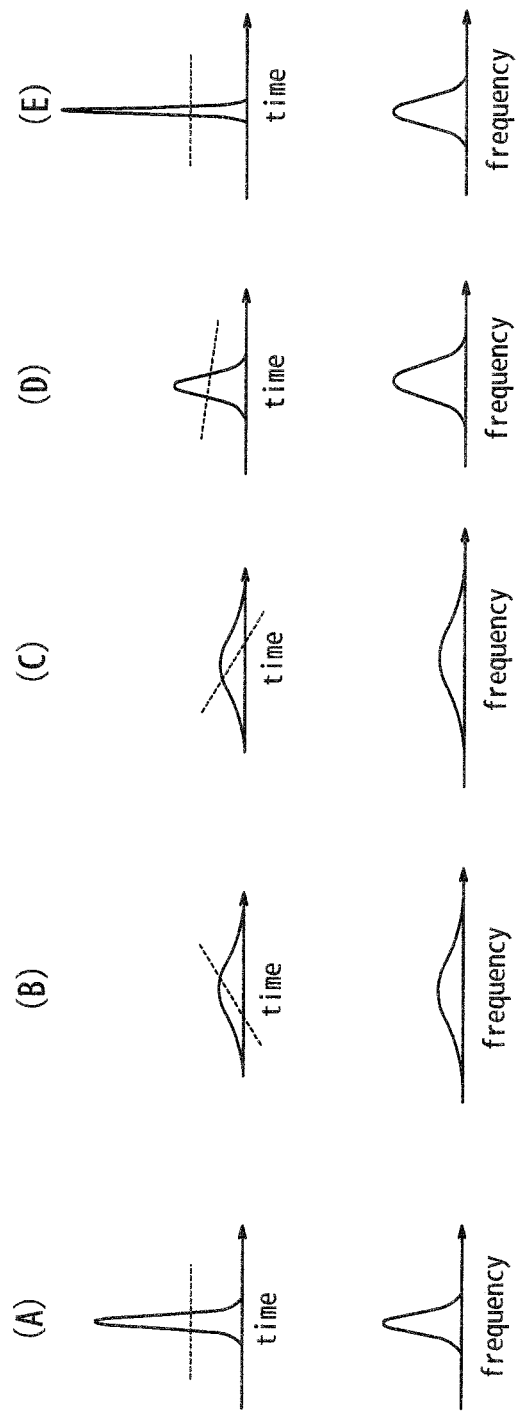
FIGS. 12(A) to 12(E) show temporal waveforms (upper side) and spectral waveforms (lower side) of an optical pulse in respective portions of FIG. 11.

FIGS. 11 and 12(A) to 12(E) each illustrate a sixth embodiment of the present invention. FIG. 11 is a block diagram illustrating a schematic configuration of an optical system having an optical fiber delivery system for delivering optical short pulses, and FIGS. 12(A) to 12(E) show temporal waveforms (upper side) and spectral widths (lower side) of an optical short pulse in the portions (A) to (E) of FIG. 11, respectively. In FIG. 12, the broken lines on the temporal waveforms in the upper side each indicate a chirp.

The optical system according to this embodiment includes: an optical short pulse source 110; nonlinear effect generation unit 120; negative group-velocity dispersion generation unit 130; an optical fiber 140; and an optical apparatus 150 that uses optical short pulses and has a positive GVD.

The optical short pulse source 110 employs an optical pulse source that generates ultrashort optical pulses close to the transform limit (TL) of high peak power, such as a titanium: sapphire laser, a mode-locked rare earth doped optical fiber laser, a mode-locked semiconductor laser, and a grain-switched semiconductor laser. Further, any one of the above lasers may be combined with an optical amplifier so as to produce ultrashort optical pulses each having, for example, a pulse width narrower than 100 picoseconds.

The nonlinear effect generation unit 120 is an optical element 1 that is configured to satisfy the conditional expression (4), and configured by including, for example, any one of the following optical fibers having a positive GVD value at the wavelength of the optical pulse: a single-mode optical fiber; a multi-mode optical fiber; a dispersion compensation fiber; a photonic crystal fiber (PCF); an amplifying optical fiber; a waveguide semiconductor optical amplifier; a planar optical waveguide; and a gradient index lens.

[Expression 6]

$$L_{NL} \leq L \leq 8L_{opt} \quad (4)$$

where, $$L_{NL} = \frac{1}{\gamma P_0}$$

$$L_{opt} = \sqrt{6 L_D L_{NL}}$$

$$L_D = \frac{T_0^2}{|\beta_2|}$$

in which: L represents a physical length of a medium forming the nonlinear effect generation unit;
γ represents a nonlinear coefficient of the medium forming the nonlinear effect generation unit;
$P_0$ represents peak power of an optical short pulse incident on the nonlinear effect generation unit;
$T_0$ represents a temporal half-width of the optical short pulse incident on the nonlinear effect generation unit when the output intensity of the optical short pulse becomes 1/e of the peak power; and
$\beta_2$ represents a group-velocity dispersion value of the nonlinear effect generation unit.

Here, $L_{NL}$ is a nonlinear length, and L needs to be equal to or larger than $L_{NL}$ in order to generate the nonlinear effect by the nonlinear effect generation unit. Further, $L_{opt}$ is known to be an optimal fiber length for making a chirp on a pulse substantially linear by the interaction between the nonlinear effect and the group-velocity dispersion effect in the optical fiber (see, for example, G. P. Agrawal, Nonlinear fiber optics, 2nd Ed., Academic Press).

The optical short pulse shown in FIG. 12(A) from the optical short pulse source 110 passes through the nonlinear effect generation unit 120, where the interaction between the positive GVD effect and the SPM effect of the nonlinear effect generation unit 120 broadens the pulse temporal width and the spectral width as illustrated in FIG. 12(B), so that the optical pulse is converted into an up-chirped pulse having further reduced peak power and a linear chirp. Here, the nonlinear effect generation unit 120 has a medium physical length limited to fall within a range indicated by the conditional expression (1). This length is determined so as to obtain sufficient nonlinear effect of the medium while minimizing the generation of GVD effect.

Figure 13:
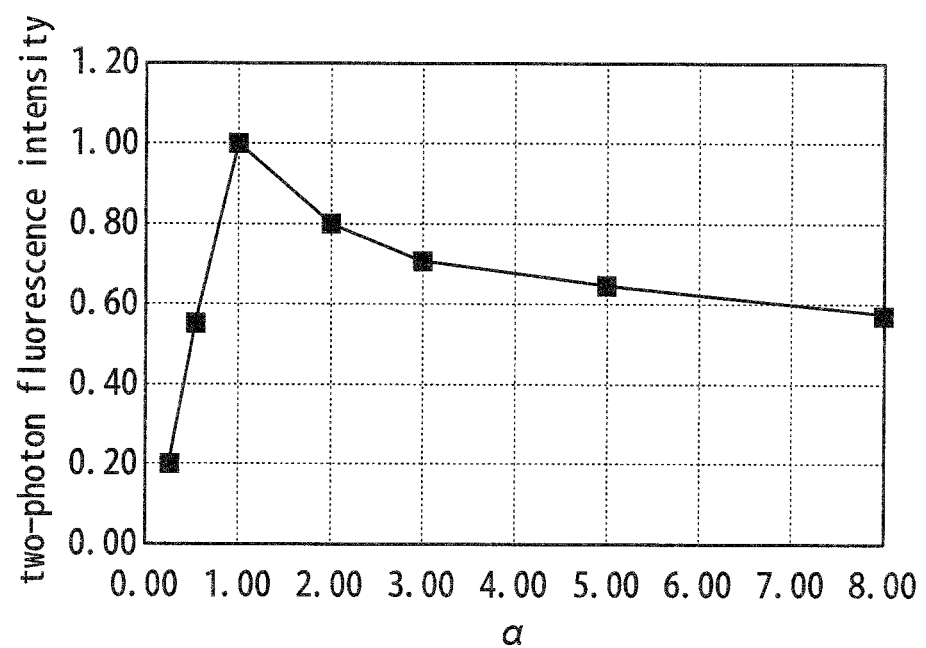
FIG. 13 is a graph showing two-photon fluorescence intensity obtained by a microscope as the optical apparatus, with respect to the length of an optical fiber as an example of the nonlinear effect generation unit of FIG. 11.

FIG. 13 is a graph showing experimental results of the two-photon fluorescence intensity obtained by the microscope 150 serving as the optical apparatus, with respect to a length of an optical fiber as an example of the nonlinear effect generation unit 120 of FIG. 11. In the experiment, the optical short pulse source 110 employed a pulse laser having an oscillation wavelength of approximately 800 nm, an average output of approximately 2 W, a pulse width of approximately 200 fs, a repetition rate of 80 MHz, and a spectral width of approximately 4.7 nm.

Further, the nonlinear effect generation unit 120 employed a large-mode area photonic crystal fiber (LMA-PCF) having a GVD value of about 36 $ps^2$ $km^{-1}$ and a nonlinear optical coefficient of approximately 1.7 $W^{-1}$ $km^{-1}$, in a wavelength range of 800 nm with a mode field diameter of 12.5 μm. Further, the negative group-velocity dispersion generation unit 130 employed a pair of diffraction gratings that were adjustable in grating pitch between the diffraction gratings, which was adjusted so that the two-photon fluorescence becomes brightest under a microscope. Further, a microscope used as the optical apparatus 150 had a GVD of 0.01 $ps^2$.

In FIG. 13, the length of the optical fiber as the nonlinear effect generation unit 120 is plotted on the abscissa α, as the multiples α of the $L_{opt}$ obtained by the conditional expression (5). Here, the $L_{opt}$ can be expressed by the following expression.

[Expression 7]

$$L_{opt} = \sqrt{6 L_D L_{NL}} \quad (5)$$

where, $$L_{NL} = \frac{1}{\gamma P_0}$$

$$L_D = \frac{T_0^2}{|\beta_2|}$$

Here, L represents a physical length of a medium forming the nonlinear effect generation unit 120, γ represents a nonlinear coefficient of the medium forming the nonlinear effect generation unit, $P_0$ represents peak power of an optical short pulse incident on the nonlinear effect generation unit 120, $T_0$ represents a temporal half-width of the optical short pulse incident on the nonlinear effect generation unit 120 when the output intensity of the optical short pulse becomes 1/e of the peak power, and $\beta_2$ represents a group-velocity dispersion value of the nonlinear effect generation unit 120.

Meanwhile, the ordinate in FIG. 13 shows the two-photon fluorescence intensity obtained from the microscope, as a value relative to a maximum value of 1.

As understood from FIG. 13, the two-photon fluorescence intensity to be observed reaches its maximum when α=1, that is, when the physical length of the medium forming the optical fiber serving as the nonlinear effect generation unit 120 satisfies the conditional expression (5). Also, the two-photon fluorescence intensity is reduced to approximately 60% as compared to the case where α=1, when α is approximately 0.5 or more and approximately 8 or less. As long as the reduction in the fluorescence intensity is small enough as described above, a sample such as the brain of a mouse can be observed near the surface thereof using the two-photon fluorescence. Further, in order to observe a deeper site (approximately 300 μm or less) of the sample, it is desirable to have two-photon fluorescence intensity of approximately 80% or more as compared to the case where α=1, and the optical fiber length in such a case satisfies α of approximately 0.8 or more and 2 or less. In the experimental example shown in FIG. 13, with the nonlinear length $L_{NL}$, α corresponds to approximately 0.05.

The up-chirped optical pulse exited from the nonlinear effect generation unit 120 is then incident on the negative group-velocity dispersion generation unit 130. The negative group-velocity dispersion generation unit 130 is formed by including, for example, any one of the following optical components providing negative GVD at the wavelength of the optical pulse: a pair of diffraction gratings; a pair of prisms; a chirped fiber Bragg grating (CFBG); Gires-Tournois (GT) interferometer; a virtually imaged phased array (VIPA) dispersion compensator; an arrayed waveguide grating (AWG); a liquid crystal spatial optical modulator; a hollow optical fiber; and a photonic crystal fiber.

The up-chirped pulse from the nonlinear effect generation unit 120 passes through the negative group-velocity dispersion generation unit 130, where the negative GVD effect of the negative group-velocity dispersion generation unit 130 converts the optical pulse into a down-chirped pulse as illustrated in FIG. 12(C). Here, the negative GVD to be provided by the negative group-velocity dispersion generation unit 130 to the optical pulse is determined such that the optical pulse is sufficiently recompressed at a desired point in the optical apparatus 150.

The negative group-velocity dispersion generation unit 130 is adjusted so as to cancel the normal dispersion of the nonlinear effect generation unit 120, the optical fiber 140, and the optical apparatus 150, and hence with the use of the nonlinear effect generation unit 120 in which the generation of normal dispersion is suppressed, the negative dispersion to be generated by the negative group-velocity dispersion generation unit 130 can be suppressed. As a result, the higher-order dispersion of third-order or more generated by the negative group-velocity dispersion generation unit 130 is also reduced to small.

The down-chirped pulse exited from the negative group-velocity dispersion generation unit 130 is then incident on the optical fiber 140. The optical fiber 140 delivers an optical pulse over a desired distance, and is configured by including, for example, any one of the following optical components having a positive GVD value at the wavelength of the optical pulse: a single-mode optical fiber; a multi-mode optical fiber; a dispersion compensation fiber; a photonic crystal fiber; and an amplifying optical fiber. The optical power incident on the optical fiber 140 is usually smaller than the optical power incident on the nonlinear effect generation unit 120 because of various optical losses. Therefore, the ratio of the nonlinear optical coefficient to the GVD value of the optical fiber 140 is often preferably equal to or greater than that of the nonlinear effect generation unit 120.

The down-chirped pulse from the negative group-velocity dispersion generation unit 130 passes through the optical fiber 140, where the interaction between the positive GVD effect and the SPM effect makes the pulse temporal width and the spectral width narrower, as illustrated in FIG. 12(D), than those of the incident pulse shown in FIG. 12(C), resulting in a down-chirped pulse having higher peak power. That is, a down-chirped pulse exited from the optical fiber 140 has a lower rate of the instantaneous frequency change than that of the down-chirped pulse incident from the negative group-velocity dispersion generation unit 130. Further, the down-chirped pulse of FIG. 12(C) is substantially unaffected by the higher-order dispersion of third-order or more, and hence the down-chirped pulse of FIG. 12(D) undergoes substantially no waveform distortion such as ringing.

Then, the GVD effect of the optical system in the optical apparatus 150 makes the optical pulse width of the down-chirped pulse incident on the optical apparatus from the optical fiber 140 even narrower whereas the spectral width remains substantially unchanged as shown in FIG. 12(E), so that the optical pulse is temporally compressed on the desired position, that is, for example, on a biological specimen, to a width same as or narrower than that of the ultrashort optical pulse emitted from the ultrashort optical pulse source 110, and also increased in peak power. Further, there occurs substantially no waveform distortion such as ringing, which is otherwise caused by the higher-order dispersion of third-order or more. Therefore, deep sites of a biological specimen can be observed with sufficient brightness.

The positive group-velocity dispersion addition unit may be disposed downstream of the optical fiber 140, so as to provide positive group-velocity dispersion to the optical short pulse exited from the optical fiber 140 and output as the optical short pulse as a down-chirped pulse having a lower rate of the instantaneous frequency change than that of the optical short pulse. The positive group-velocity dispersion addition unit is configured by including any one of the following optical components: a light-transmitting substrate; a lens; an acousto-optic modulator; an electro-optic modulator; a diffraction grating; and a prism. Further, the positive group-velocity dispersion addition unit may include an adjustment mechanism for adjusting the amount of positive group-velocity dispersion.

Figure 14:
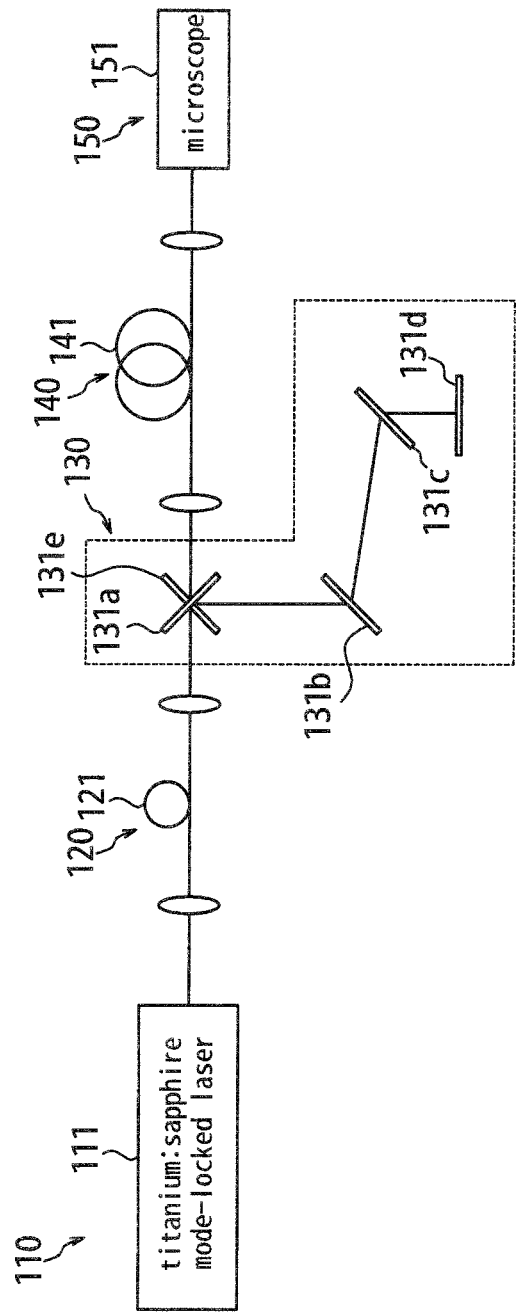
FIG. 14 is a diagram illustrating a specific configuration example of the optical system having the optical fiber delivery system for delivering optical short pulses of FIG. 11.

FIG. 14 is a diagram illustrating a specific configuration example of the optical system having the optical fiber delivery system for delivering optical short pulses of FIG. 11. The optical system employs, as the optical short pulse source 110, a titanium:sapphire mode-locked laser 111 that produces ultrashort optical pulses each having an oscillation wavelength of approximately 800 nm, a pulse width of approximately 100 fs (femtoseconds), a repetition rate of 80 MHz, a spectral width of approximately 9.4 nm, and an average optical output power of approximately 1 W.

The nonlinear effect generation unit 120 employs a large-mode area photonic crystal fiber (LMA-PCF) 121 that has a GVD value of about 36 $ps^2$ $km^{-1}$ and a nonlinear optical coefficient of approximately 1.7 $W^{-1}$ $km^{-1}$, in a wavelength range of 800 nm with a fiber length of 0.053 m. The length of the LMA-PCF 121 is an optimal value calculated based on the above-mentioned conditional expression (5).

The negative group-velocity dispersion generation unit 130 includes: a mirror 131a; diffraction gratings 131b, 131c; and rectangular mirrors 131d and 131e, and is configured in such a manner that optical short pulses exited from the LMA-PCF 121 are deflected by the mirror 131a and sequentially diffracted by the diffraction gratings 131b and 131c, and then reversed in optical path by the rectangular mirror 131d so as to be transmitted via the diffraction gratings 131c, 131b, and the rectangular mirror 131e to be exited therefrom. The diffraction gratings 131b, 131c forming a pair each have a diffraction density of 1200 line/mm, and a diffraction pitch of 31 mm. This configuration provides a GVD of about −0.12 $ps^2$ and a group-velocity dispersion slope (GVDS) of about 0.00024 $ps^3$. Here, the GVDS is an amount of third-order dispersion.

The optical fiber 140 is formed by using a large-mode area photonic crystal fiber (LMA-PCF) 141 having a GVD value of about 36 $ps^2$ $km^{-1}$ and a nonlinear optical coefficient of approximately 1.7 $W^{-1}$ $km^{-1}$, in a wavelength range of 800 nm with a mode field diameter of 12.5 μm and a length of 3 m.

Further, the optical apparatus 150 employs a microscope 151 having a GVD of about 0.01 ps².

Further, positive group-velocity dispersion addition unit similar to that of FIG. 6 may be disposed upstream of an objective lens of the microscope of FIG. 14.

With the above-mentioned configuration, each of the ultrashort optical pulses emitted from the titanium:sapphire mode-locked laser 111 is incident on the LMA-PCF 121, and passes through the LMA-PCF 121 where the optical pulse undergoes the nonlinear effect and the normal dispersion effect, so as to be converted into an up-chirped optical short pulse having temporal waveform and frequency waveform broadened. At this time, the length of the LMA-PCF 121 is defined to about 0.053 m, so as to suppress excessive generation of the normal dispersion effect. The optical short pulses exited from the LMA-PCF 121 are incident on the negative group-velocity dispersion generation unit 130 including the diffraction gratings 131b, 131c, and exited as down-chirped optical short pulses due to the negative dispersion effect. At this time, the negative group-velocity dispersion generation unit 130 is configured in such a manner that the total dispersion of the optical system from the titanium:sapphire mode-locked laser 111 to the microscope 151 becomes substantially zero. Accordingly, the normal dispersion effect in the LMA-PCF 121 is suppressed, which makes it possible to suppress the amount of negative dispersion to be generated in the negative group-velocity dispersion generation unit 130. For this reason, the generation of higher-order dispersion of third-order or more can also be suppressed. Further, optical short pulses exited from the negative group-velocity dispersion generation unit 130 are incident on the LMA-PCF 141, where the pulses are compressed by the interaction between the nonlinear effect and the normal dispersion effect, and are then incident on the microscope 151 where the pulses are further compressed by the normal dispersion so as to be converted into ultrashort optical pulses, to thereby irradiate a specimen in the microscope 151.

In the ultrashort optical pulses in the microscope 151, the generation of higher-order dispersion of third-order or more is suppressed by the negative group-velocity dispersion generation unit 130, and hence the generation of waveform distortion such as ringing can be suppressed. This configuration of the optical system provides, on the microscope specimen, an ultrashort optical pulse that has a wavelength in a range of approximately 800 nm and an optical pulse width of about 100 fs or less, in which the effect of the waveform distortion resulting from the higher-order dispersion of third-order or more is suppressed to a level that can be substantially ignored. Further, the positive group-velocity dispersion addition unit similar to that of FIG. 6 is disposed, so as to add an appropriate GVD according to the dispersion of each objective lens, with the result that any of the objective lenses can provide an optical short pulse having high peak power on the specimen surface.

As described above, according to this embodiment, optical short pulses having high peak power pass through the nonlinear effect generation unit that is configured to satisfy the conditional expression (4), preferably have L of 0.5 $L_{opt}$ or more, and further preferably satisfy the conditional expression (5); the negative group-velocity dispersion generation unit; and the optical fiber, so as to be exited as down-chirped optical short pulses. Accordingly, the effect of waveform distortion resulting from the higher-order dispersion of third-order or more can be alleviated, and optical short pulses having high peak power can be efficiently delivered so as to obtain optical short pulse having high peak power at a desired position in the optical apparatus where the optical pulses are to be used.

Seventh Embodiment

Figure 15:
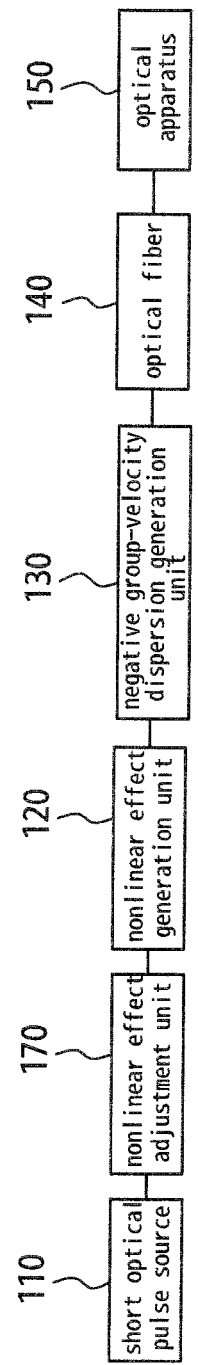
FIG. 15 is a block diagram illustrating a schematic configuration of an optical system having an optical fiber delivery system for delivering optical short pulses according to a seventh embodiment of the present invention.

FIG. 15 is a block diagram illustrating a schematic configuration of an optical system having an optical fiber delivery system for delivering optical short pulses according to a seventh embodiment of the present invention. This embodiment has nonlinear effect adjustment unit 170 for adjusting the nonlinear effect generated in the nonlinear effect generation unit 120, disposed between the optical short pulse source 110 and the nonlinear effect generation unit 120 in the configuration according to the sixth embodiment shown in FIG. 11. The nonlinear effect adjustment unit 170 may be configured by including any one of the following optical components: a light transmission substrate such as a glass rod, a lens, an acousto-optic modulator, an electro-optic modulator, a diffraction grating, and a prism.

Figure 16:
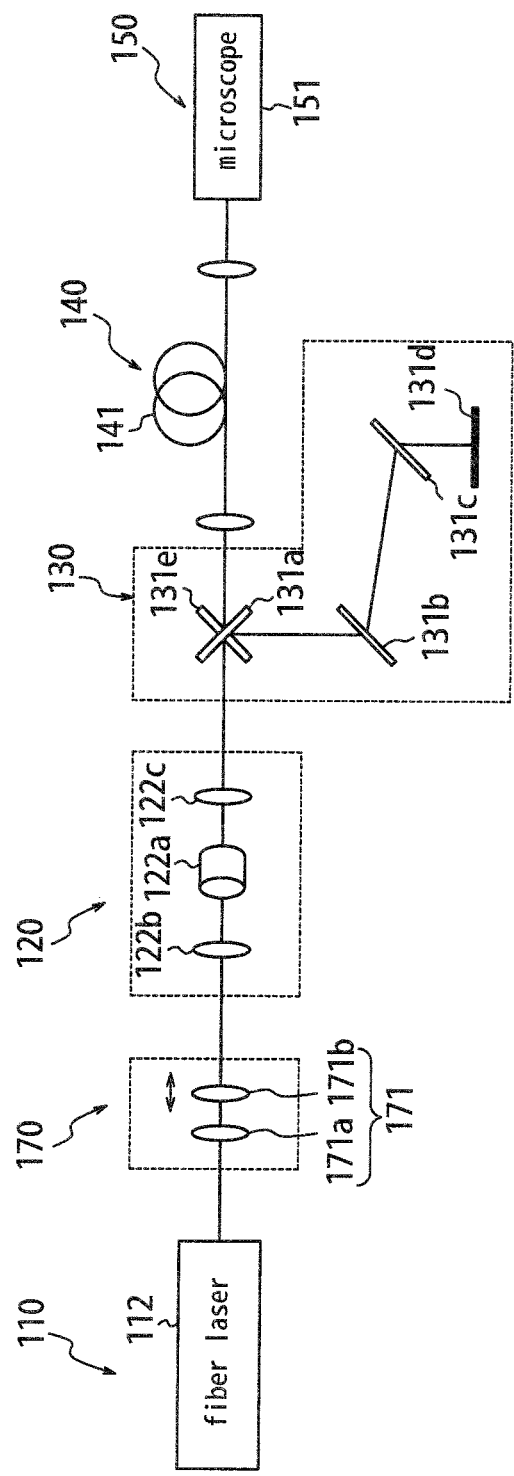
FIG. 16 is a diagram illustrating a specific configuration example of the optical system having the optical fiber delivery system for delivering optical short pulses of FIG. 15.

FIG. 16 is a diagram illustrating a specific configuration example of the optical system having the optical fiber delivery system for delivering optical short pulses of FIG. 15. The optical short pulse source 110 employs a fiber laser 112 having an oscillation wavelength of 1060 nm, a pulse width of approximately 500 fs, a repetition rate of 1 MHz, a spectral width of approximately 3.3 nm, and a pulse energy of approximately 2 µJ.

Further, the nonlinear effect adjustment unit 170 employs a beam expander 171 including convex lenses 171a and 171b. The convex lens 171a and the convex lens 171b are arranged as being opposed to each other so as to have the optical axis in line with the optical path of the fiber laser 112, and the convex lens 171b can be displaced in the optical axis direction. This configuration allows the beam expander 171 to change the light flux diameter incident on the nonlinear effect generation unit 120 disposed downstream, so as to change the spot diameter, to thereby successively change the amount of the nonlinear effect to be generated in the quartz rod.

Figure 17:
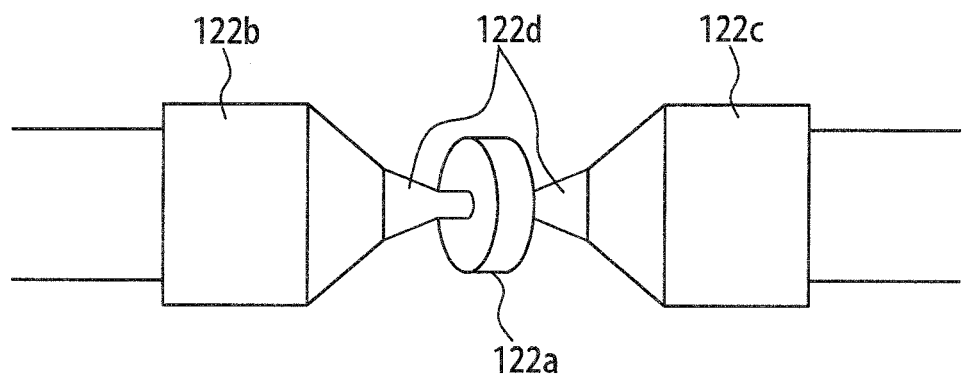
FIG. 17 is a view illustrating a detailed configuration of the nonlinear effect generation unit of FIG. 16.

Further, the nonlinear effect generation unit 120 is formed of a quartz rod 122a and high-NA objective lenses 122b and 122c that are arranged along the optical axis so as to sandwich the quartz rod 122a, as illustrated in detail in FIG. 17. Immersion oil 122d is filled between the quartz rod 122a and the high NA objective lens 122b and between the quartz rod 122a and the high NA objective lens 122c. The quartz rod 122a has a nonlinear optical coefficient of 253.5 $W^{-1}$ $km^{-1}$ and a GVD value of 17 $ps^2$ $km^{-1}$ in a wavelength range of 1060 nm with a length of 1 µm. The length of the quartz rod 122a is a value calculated based on the above-mentioned expression:

$$L_{NL}=1/\gamma P_0. \quad \text{[Expression 8]}$$

The high-NA objective lenses 122b, 122c each have a numerical aperture NA of 1.45 (oil immersion), a spot radius of 0.44 µm, and a focal depth of 1 µm. The optical short pulses exited from the beam expander 171 pass through the high-NA objective lens 122b and the quartz rod 122a so as to be exited from the high-NA objective lens 122c. With this configuration, no coupling loss to the fiber is generated, as compared to the case of employing an optical fiber as the nonlinear effect generation unit 120, and hence the optical short pulses can further be increased in transmittance. Further, in this embodiment, the high-NA objective lens employs an oil immersion lens. However, it is more preferable not to use an oil immersion objective lens or a water immersion objective lens because oil or the like generates group-velocity dispersion.

Further, the negative group-velocity dispersion generation unit 130 includes: the mirror 131a; the diffraction gratings 131b, 131c; and the rectangular mirrors 131d and 131e, and is configured in such a manner that optical short pulses exited from the high-NA objective lens 122c of the nonlinear effect generation unit 120 are deflected by the mirror 131a and sequentially diffracted by the diffraction gratings 131b and 131c, and then reversed in optical path by the rectangular mirror 131d so as to be transmitted via the diffraction gratings 131c, 131b, and the rectangular mirror 131e to be exited therefrom. The pair of diffraction gratings 131b, 131c each have a diffraction density of approximately 600 line/mm, a diffraction pitch of approximately 40 mm, a GVD of approximately $-0.07$ $ps^2$, and the GVDS of approximately 0.00015 $ps^3$. This configuration provides a GVD of about $-0.07$ $ps^2$ and a GVDS of about 0.00015 $ps^3$.

Further, the optical fiber 140 is formed by using a large-mode area photonic crystal fiber (LMA-PCF) 141 having a GVD value of about 17 $ps^2$ $km^{-1}$ and a nonlinear optical coefficient of approximately 1.28 $W^{-1}$ $km^{-1}$, in a wavelength range of 1060 nm with a mode field diameter of 12.5 μm and a length of 3 m. Further, the optical apparatus 150 employs a microscope 151 having a GVD of about 0.01 $ps^2$, which is similar to that illustrated in the specific example of the sixth embodiment.

The above-mentioned configuration of the optical system provides, similarly to the sixth embodiment, on the microscope specimen, an ultrashort optical pulse that has a wavelength in a range of about 1060 nm, in which the effect of the waveform distortion resulting from the higher-order dispersion of third-order or more is reduced to a level that can be substantially ignored. Further, the beam expander 171 is provided as the nonlinear effect adjustment unit 170, so that the optical pulse incident on the high-NA objective lens 122b is changed in light flux diameter, so that the spot diameter thereof in the quartz rod 122a as a nonlinear medium can be adjusted, to thereby adjust the amount of the nonlinear effect to be generated in the quartz rod 122a.

As the optical short pulse source 110, similarly to the one shown in FIG. 10, a fiber type optical amplifier may be disposed downstream of the fiber laser 112. This configuration can provide optical short pulses having higher peak power on the specimen in the microscope 151.

Eighth Embodiment

Figure 18:
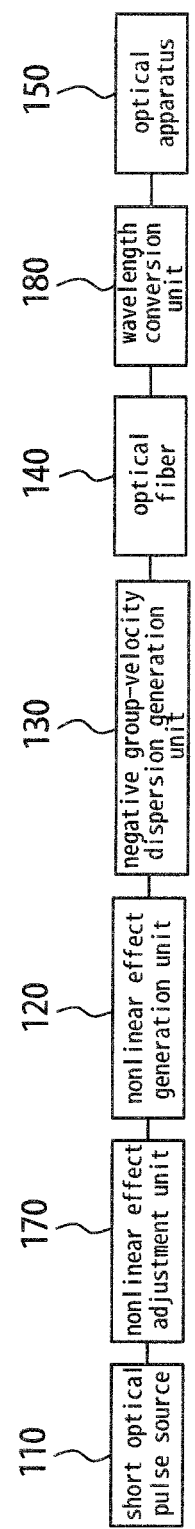
FIG. 18 is a block diagram illustrating a schematic configuration of an optical system having an optical fiber delivery system for delivering optical short pulses according to an eighth embodiment of the present invention.

FIG. 18 is a block diagram illustrating a schematic configuration of an optical system having an optical fiber delivery system for delivering optical short pulses according to an eighth embodiment of the present invention. In this embodiment, wavelength conversion unit 180 is disposed between the optical fiber 140 and the optical apparatus 150 in the optical system according to the seventh embodiment illustrated in FIG. 15. The specific configuration of each component is described below.

Figure 19:
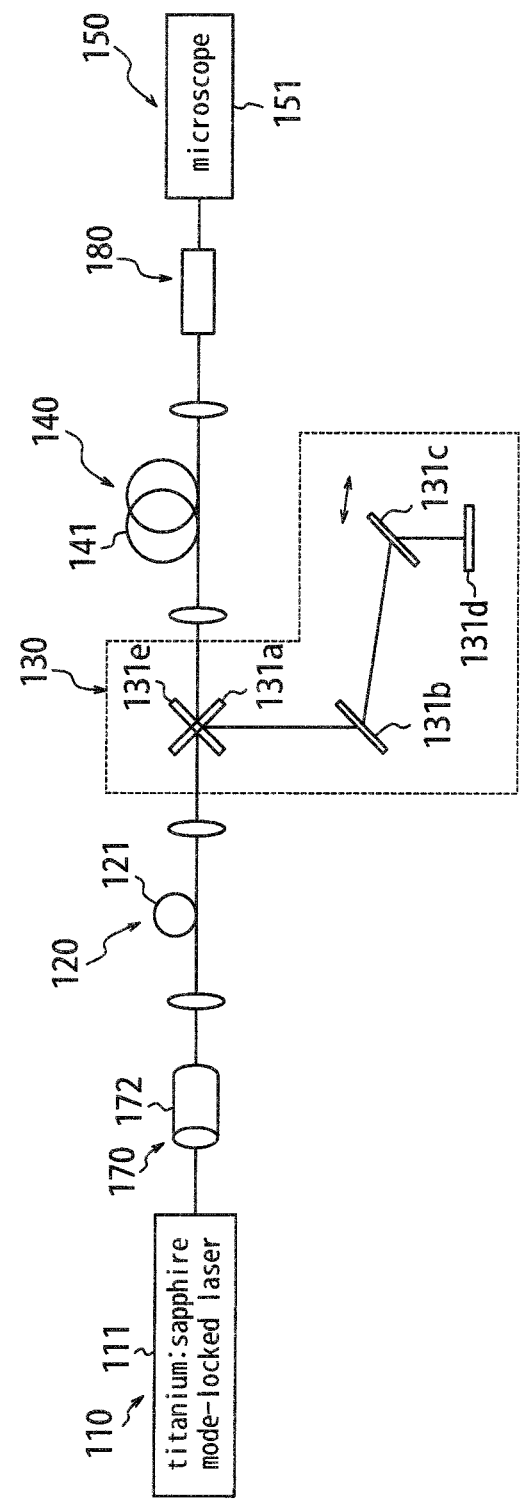
FIG. 19 is a diagram illustrating a specific configuration example of the optical system having the optical fiber delivery system for delivering optical short pulses of FIG. 18.
Figure 20:
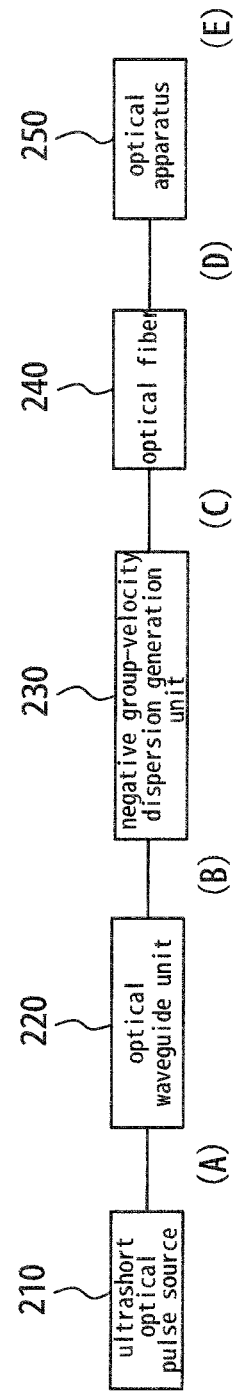
FIG. 20 is a block diagram illustrating a schematic configuration of an optical system having an optical fiber delivery system for delivering optical short pulses according to a conventional art.
Figure 21:
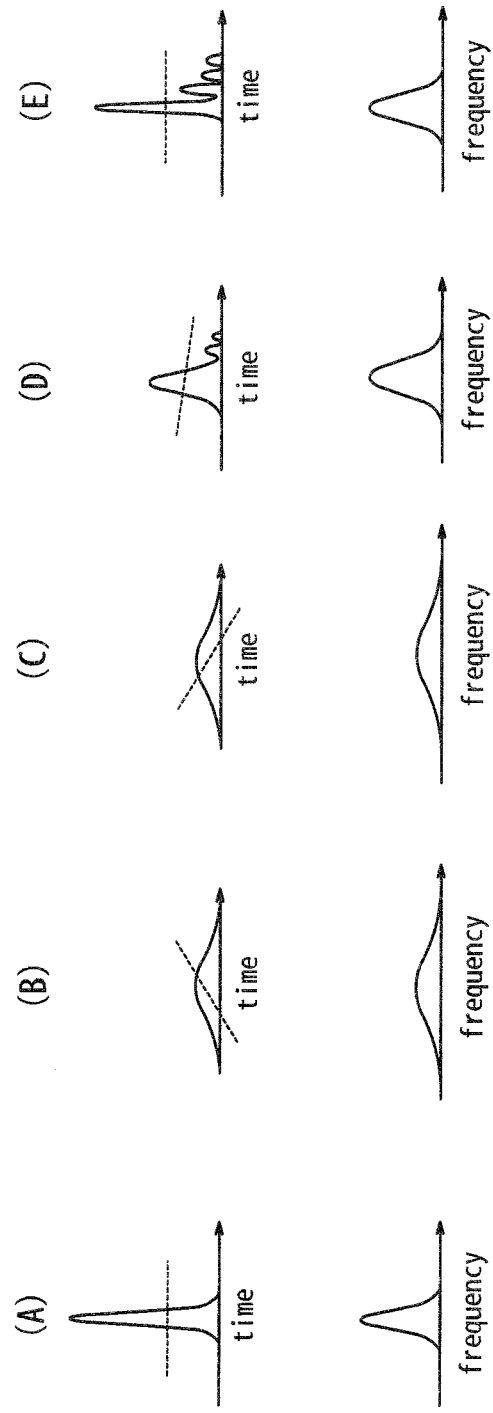
FIGS. 21(A) to 21(E) show temporal waveforms (upper side) and spectral waveforms (lower side) of an optical pulse in respective portions of FIG. 20, which are to be obtained when an incident optical short pulse is assumed to have high peak power.

FIG. 19 is a diagram illustrating a specific configuration example of the optical system having the optical fiber delivery system for delivering optical short pulses of FIG. 18. The optical system employs, as the optical short pulse source 110, a titanium:sapphire mode-locked laser 111 that produces optical pulses each having an oscillation wavelength of approximately 1030 nm, a pulse width of approximately 120 fs, a spectral width of approximately 13.0 nm, a repetition rate of 90 MHz, and an average optical output power of approximately 1 W.

Further, as the nonlinear effect adjustment unit 170, a glass rod 172 is disposed. The glass rod 172 is formed of a glass material (SF6) of 0.084 m in length, having a nonlinear optical coefficient of 1.32 $W^{-1}$ $km^{-1}$, a GVD value of approximately $1.3 \times 10^{-4}$ $ps^2$ $mm^{-1}$, and a GVD of approximately 0.006 $ps^2$. The glass rod 172 having normal dispersion is disposed upstream of the nonlinear effect generation unit 120, so that up-chirped optical short pulses are incident on the nonlinear effect generation unit 120. As a result, the optical short pulses are reduced in peak power, so that the spectral broadening due to the nonlinear effect generated by the nonlinear effect generation unit 120 disposed downstream can be suppressed, with the result that the effect of the third-order dispersion produced by the negative group-velocity dispersion generation unit 130 can be alleviated. Here, the glass rod 172 may be incorporated into the optical short pulse source 110 so as to be formed as an integral light source (chirped pulse source).

The nonlinear effect generation unit 120 employs an LMA-PCF 121 that has a nonlinear optical coefficient of approximately 1.32 $W^{-1}$ $km^{-1}$ and a GVD value of about 19 $ps^2$ $km^{-1}$, with a fiber length of 0.12 m. The length of the LMA-PCF 121 is an optimal value calculated based on the above-mentioned conditional expression (5). The negative group-velocity dispersion generation unit 130 is similar in configuration to that of FIG. 14, and includes a pair of diffraction gratings 131b, 131c. However, the diffraction gratings 131b, 131c forming a pair employed herein each have a diffraction density of approximately 850 line/mm, a diffraction pitch of approximately 42 mm, a GVD of about $-0.08$ $ps^3$, and a GVDS of 0.0002 $ps^3$. This configuration provides a GVD of about $-0.08$ $ps^2$ and a GVDS of about 0.0002 $ps^3$. Alternatively, the diffraction grating 131c may be provided with an adjustment mechanism so as to be adjustable in position, to thereby change the GVD. Further, the optical fiber 140 employs an LMA-PCF 141 having a nonlinear optical coefficient of approximately 1.32 $W^{-1}$ $km^{-1}$ and a GVD value of 19 $ps^2$ $km^{-1}$, with a fiber length of 3 m.

Further, the wavelength conversion unit 180 employs, for example, periodically poled lithium niobate (PPLN). The wavelength conversion unit 180 converts the wavelength of an optical pulse incident from the LMA-PCF 141 from 1030 nm to 515 nm by the second-harmonic generation, and outputs the optical pulse to the microscope 151 serving as the optical apparatus 150 having a GVD of 0.006 $ps^2$.

This embodiment employs the wavelength conversion unit 180, which allows a second-harmonic optical pulse having a shorter wavelength to be exited to the microscope 151. Further, similarly to the sixth and seventh embodiments, there occurs substantially no waveform distortion in the optical pulse due to higher-order dispersion, so that ultrashort optical pulses having high peak power can be supplied to the wavelength conversion unit, to thereby obtain high second-harmonic conversion efficiency. When the diffraction grating 131c is provided with an adjustment mechanism for adjusting the GVD, it is possible to make an adjustment to obtain high peak power at a desired position in the wavelength conversion unit 180.

It should be noted that the present invention is not limited only to the above-mentioned embodiments, and may be subjected to various modifications and alterations. For example, the present invention can be applied, not only to microscopes, but also to various fields using ultrashort optical pulses, such as endoscopes and pulse-based processing apparatuses.

DESCRIPTION OF SYMBOLS 10 chirped pulse source
11 ultrashort optical pulse source 20 optical waveguide unit
30 negative group-velocity dispersion generation unit
40 optical fiber
50 optical apparatus
51 microscope
52 endoscope objective lens
60 positive group-velocity dispersion generation unit
70 positive group-velocity dispersion addition unit
81 microscope
82 endoscope
91 wavelength conversion unit
110 optical short pulse source
120 nonlinear effect generation unit
130 negative group-velocity dispersion generation unit
140 optical fiber
150 optical apparatus
151 microscope
152 microscope main body
170 nonlinear effect adjustment unit
180 wavelength conversion unit
210 ultrashort optical pulse source
220 optical waveguide unit
230 negative group-velocity dispersion generation unit
240 optical fiber
250 optical apparatus

The invention claimed is:

1. An optical fiber delivery system for delivering optical short pulses, comprising:
   a chirped pulse source for emitting an up-chirped optical short pulse having high peak power, the chirped pulse source including:
      an ultrashort optical pulse source for emitting an ultrashort optical pulse; and
      a positive group-velocity dispersion generation unit for providing positive group-velocity dispersion to the ultrashort optical pulse emitted from the ultrashort optical pulse source, and outputting the ultrashort optical pulse as the up-chirped optical short pulse that is smaller in peak power than the ultrashort optical pulse;
   an optical waveguide unit for delivering the optical short pulse emitted from the chirped pulse source;
   a negative group-velocity dispersion generation unit for providing negative group-velocity dispersion to the optical short pulse exited from the optical waveguide unit; and
   an optical fiber for delivering the optical short pulse exited from the negative group-velocity dispersion generation unit, along a desired distance,
   wherein the optical short pulse emitted from the chirped pulse source is adapted to be exited, from the optical fiber, as a down-chirped optical short pulse.

2. The optical fiber delivery system for delivering optical short pulses according to claim 1, wherein the optical waveguide unit has a positive group-velocity dispersion value.

3. The optical fiber delivery system for delivering optical short pulses according to claim 1, wherein the optical fiber has a positive group-velocity dispersion value.

4. The optical fiber delivery system for delivering optical short pulses according to claim 1, further comprising, downstream of the optical fiber, a positive group-velocity dispersion addition unit for providing positive group-velocity dispersion to the optical short pulse exited from the optical fiber so as to output the optical short pulse as a down-chirped pulse having a lower rate of the instantaneous frequency change than that of the optical short pulse.

5. The optical fiber delivery system for delivering optical short pulses according to claim 4, wherein the positive group-velocity dispersion addition unit has a positive group-velocity dispersion addition amount adjustment mechanism for adjusting the amount of positive group-velocity dispersion.

6. The optical fiber delivery system for delivering optical short pulses according to claim 1, wherein the negative group-velocity dispersion generation unit has a negative group-velocity dispersion amount adjustment mechanism for adjusting the amount of negative group-velocity dispersion.

7. The optical fiber delivery system for delivering optical short pulses according to claim 1, wherein the positive group-velocity dispersion generation unit has a positive group-velocity dispersion amount adjustment mechanism for adjusting the amount of positive group-velocity dispersion.

8. An optical fiber delivery method of delivering optical short pulses, comprising the steps of:
   causing an up-chirped optical short pulse having high peak power to be incident on the an optical waveguide unit, wherein the step of causing the up-chirped optical short pulse includes the steps of:
   emitting an ultrashort optical pulse; and
   providing positive group-velocity dispersion to the ultrashort optical pulse and outputting the up-chirped optical short pulse that is smaller in peak power than the ultrashort optical pulse;
   delivering the optical short pulse using the optical waveguide unit;
   providing negative group-velocity dispersion using a negative group-velocity dispersion generation unit, to the optical short pulse exited from the optical waveguide unit;
   delivering the optical short pulse exited from the negative group-velocity dispersion generation unit, along a desired distance using an optical fiber; and
   outputting, from the optical fiber, the optical short pulse as a down-chirped optical short pulse.

* * * * *